United States Patent [19]

Tanabe et al.

[11] Patent Number: 5,097,340
[45] Date of Patent: Mar. 17, 1992

[54] EXPOSURE CONTROL DEVICE FOR STILL VIDEO CAMERA

[75] Inventors: Hideki Tanabe; Yoshito Tanaka; Yoshihiro Tanaka; Nobuyuki Taniguchi, all of Azuchi, Japan

[73] Assignee: Minolta Camera Kabushiki Kaisha, Osaka, Japan

[21] Appl. No.: 458,546

[22] Filed: Dec. 28, 1989

[30] Foreign Application Priority Data

Dec. 28, 1988 [JP] Japan ................ 63-331102
Dec. 28, 1988 [JP] Japan ................ 63-331103
Dec. 28, 1988 [JP] Japan ................ 63-331104
Dec. 28, 1988 [JP] Japan ................ 63-331105

[51] Int. Cl.$^5$ .................. H04N 3/14; H04N 5/335; H04N 5/225; H04N 5/238
[52] U.S. Cl. .................. 358/213.19; 358/909; 358/228
[58] Field of Search .............. 358/213.19, 909, 211, 358/228, 209, 225, 213.24; 354/413, 416

[56] References Cited

U.S. PATENT DOCUMENTS

| | | | |
|---|---|---|---|
| 4,608,605 | 8/1986 | Okino | 358/909 |
| 4,635,123 | 1/1987 | Masunaga et al. | 358/213.19 |
| 4,768,876 | 4/1988 | Okino | 358/225 |
| 4,860,108 | 8/1989 | Saito et al. | 358/213.19 |
| 4,881,127 | 11/1989 | Isoguchi et al. | 358/213.19 |
| 4,963,985 | 10/1990 | Isoguchi et al. | 358/227 |

FOREIGN PATENT DOCUMENTS

| | | |
|---|---|---|
| 0280511 | 2/1988 | European Pat. Off. |
| 58-104573 | 6/1983 | Japan |
| 9223080 | 12/1984 | Japan ............ 358/213.19 |
| 60-25390 | 2/1985 | Japan |

Primary Examiner—Howard W. Britton
Assistant Examiner—Wendy R. Greening
Attorney, Agent, or Firm—Burns, Doane, Swecker & Mathis

[57] ABSTRACT

An exposure control device for a still video camera having an imaging device provided with shutter function, a flash device for emitting light, and a light metering device for obtaining brightness information of an object for exposure control or a distance metering device for obtaining information of an object distance, is adapted for actuating the flash to emit during the accumulation time of signal charges in the imaging device, sweeping unnecessary charges out from a transfer section of the imaging device when the flash emitting is completed, and transferring the accumulated signal charges to the transfer section, whereby smear factor of the image signal can be eliminated. The flash is emitted when the accumulation of signal charges starts and the flash stops emitting when the proper exposure is attained. The emitting time is determined by the object distance, thereby the flash emission contributes to a proper exposure.

9 Claims, 19 Drawing Sheets

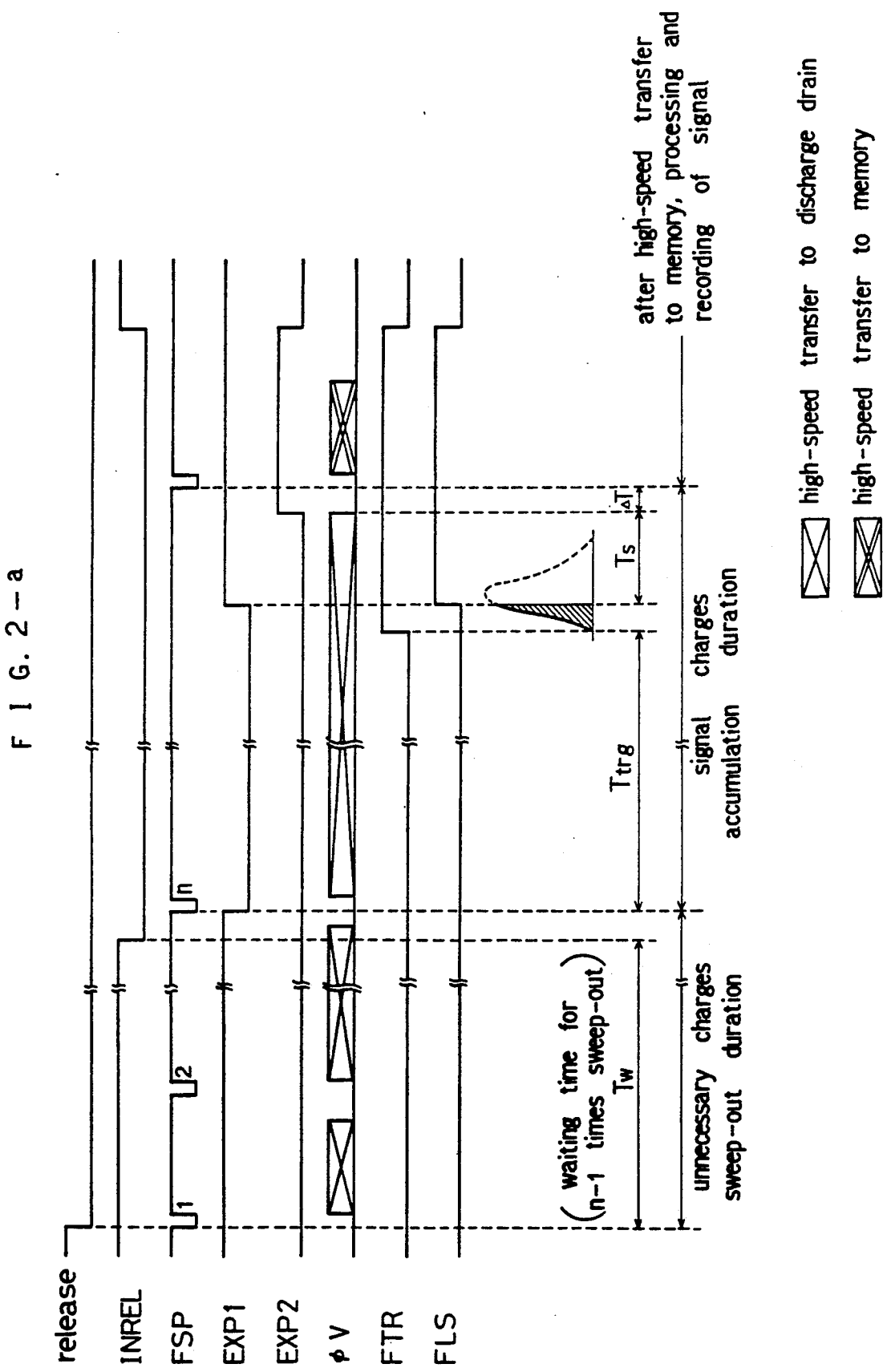

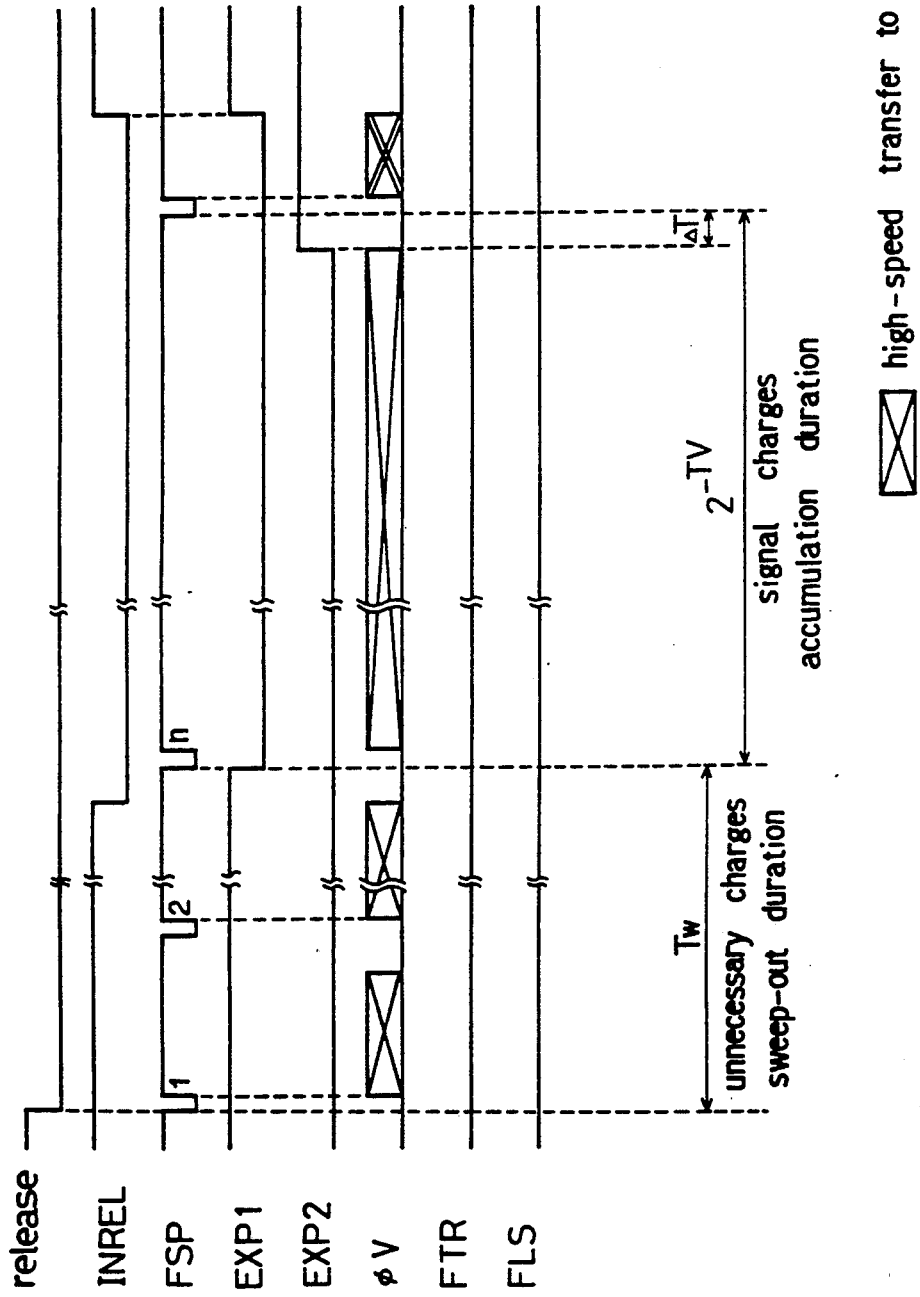

FIG. 3-a
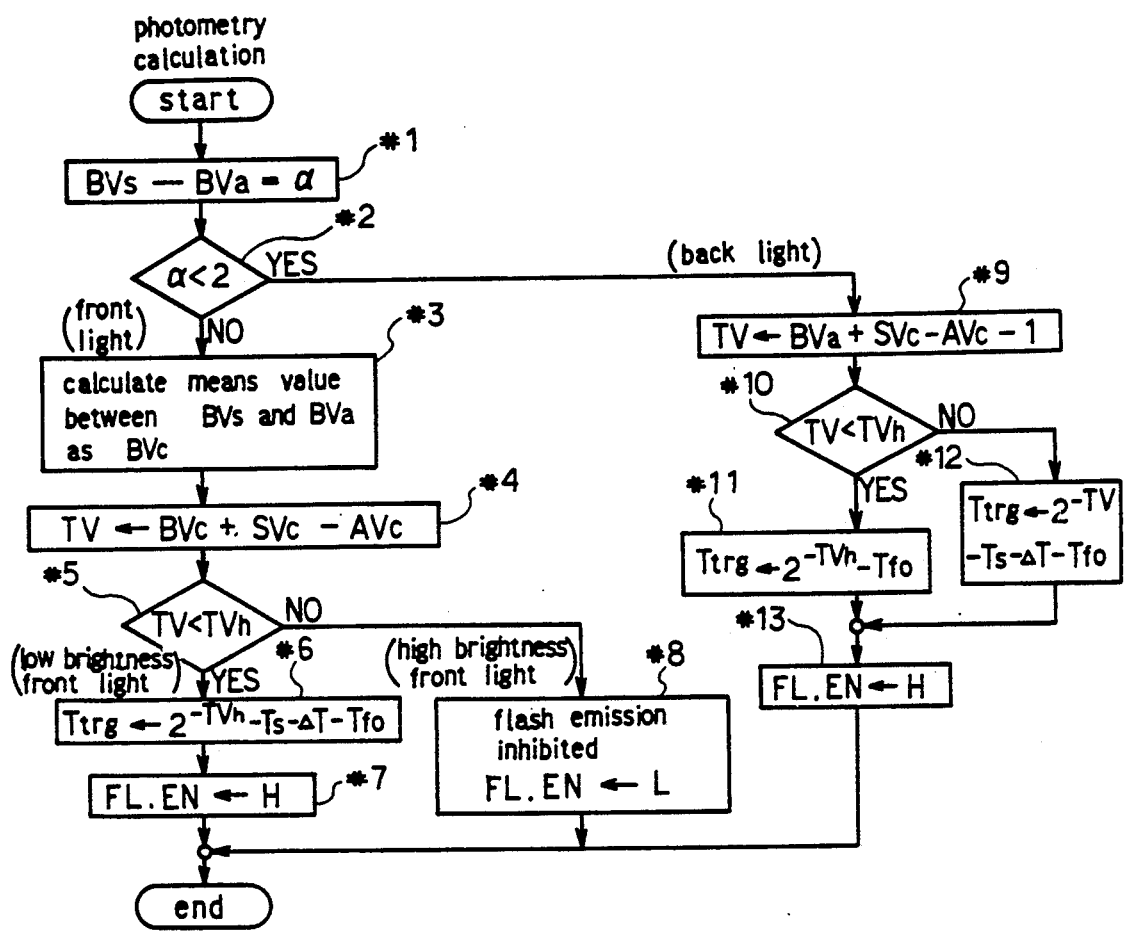
FIG. 3-b
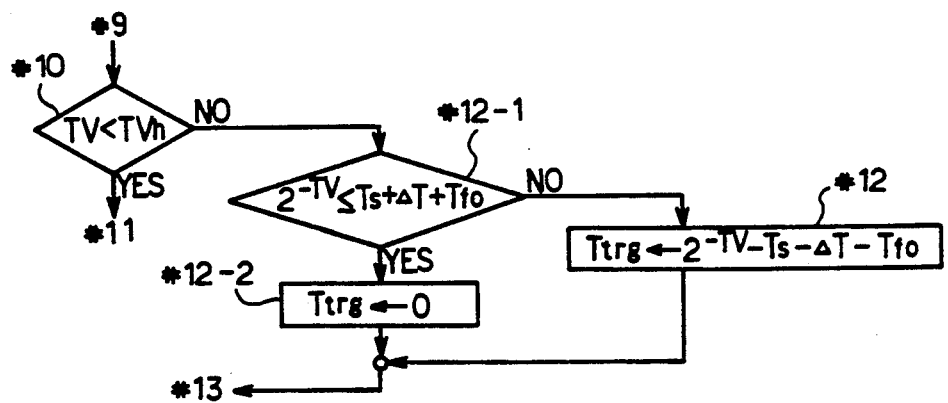

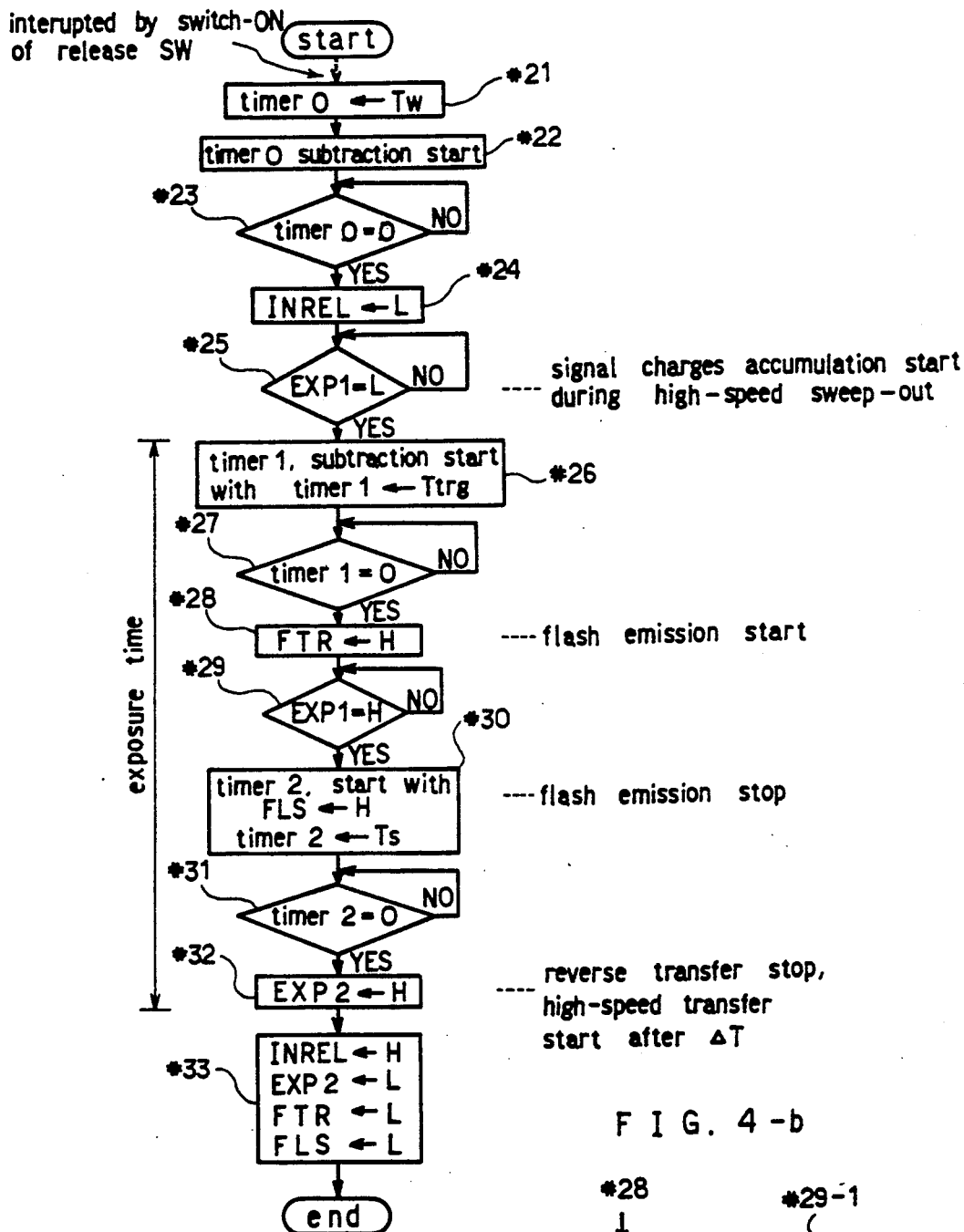
FIG. 4-a
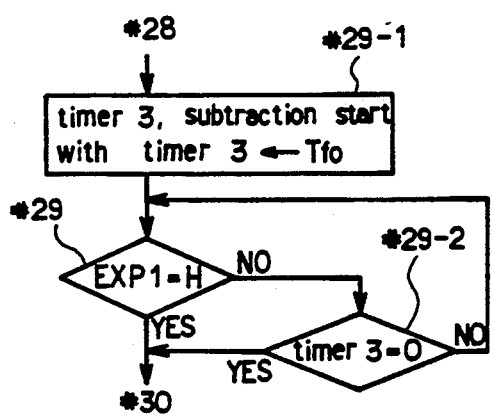
FIG. 4-b

FIG. 4-c
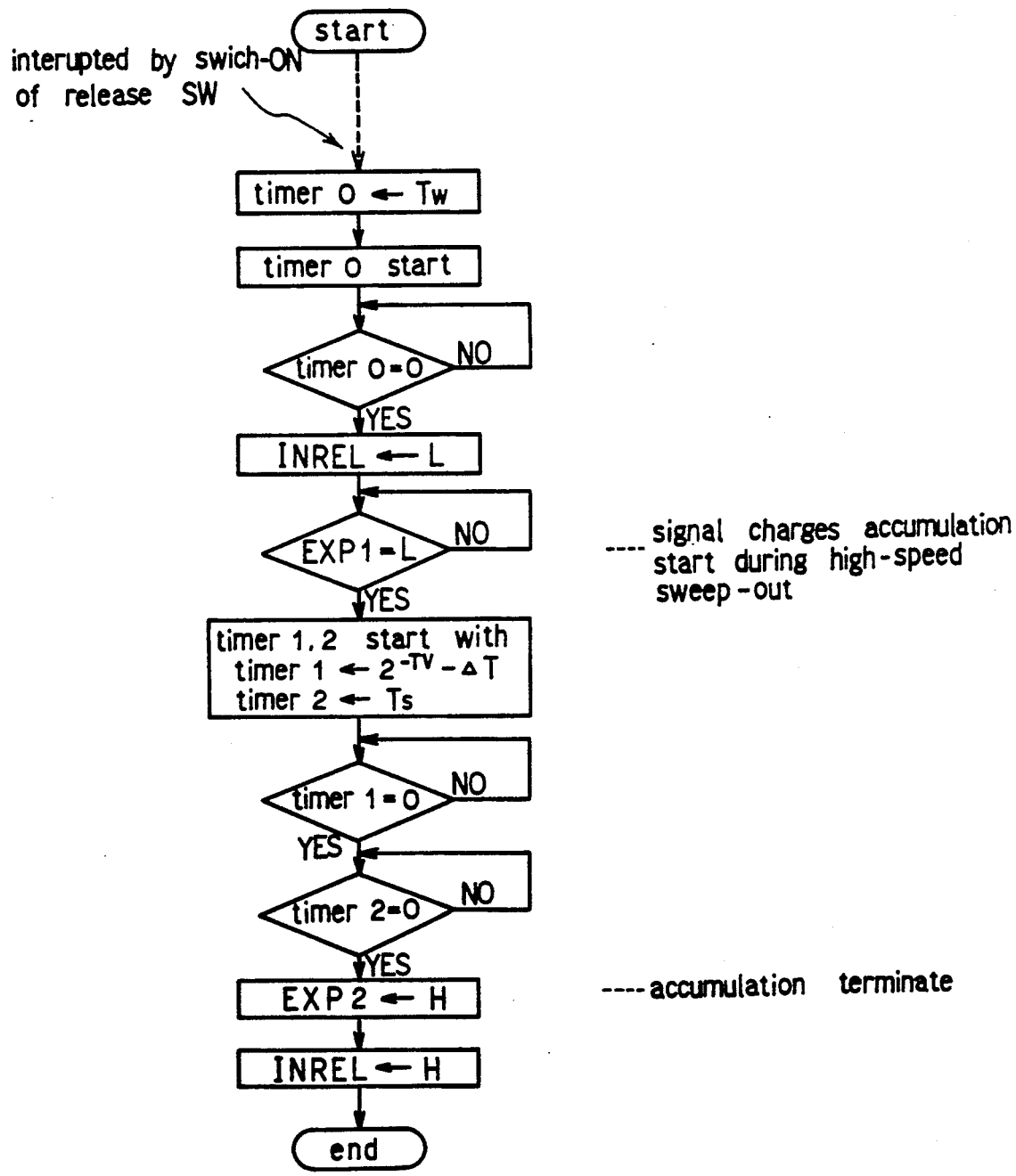

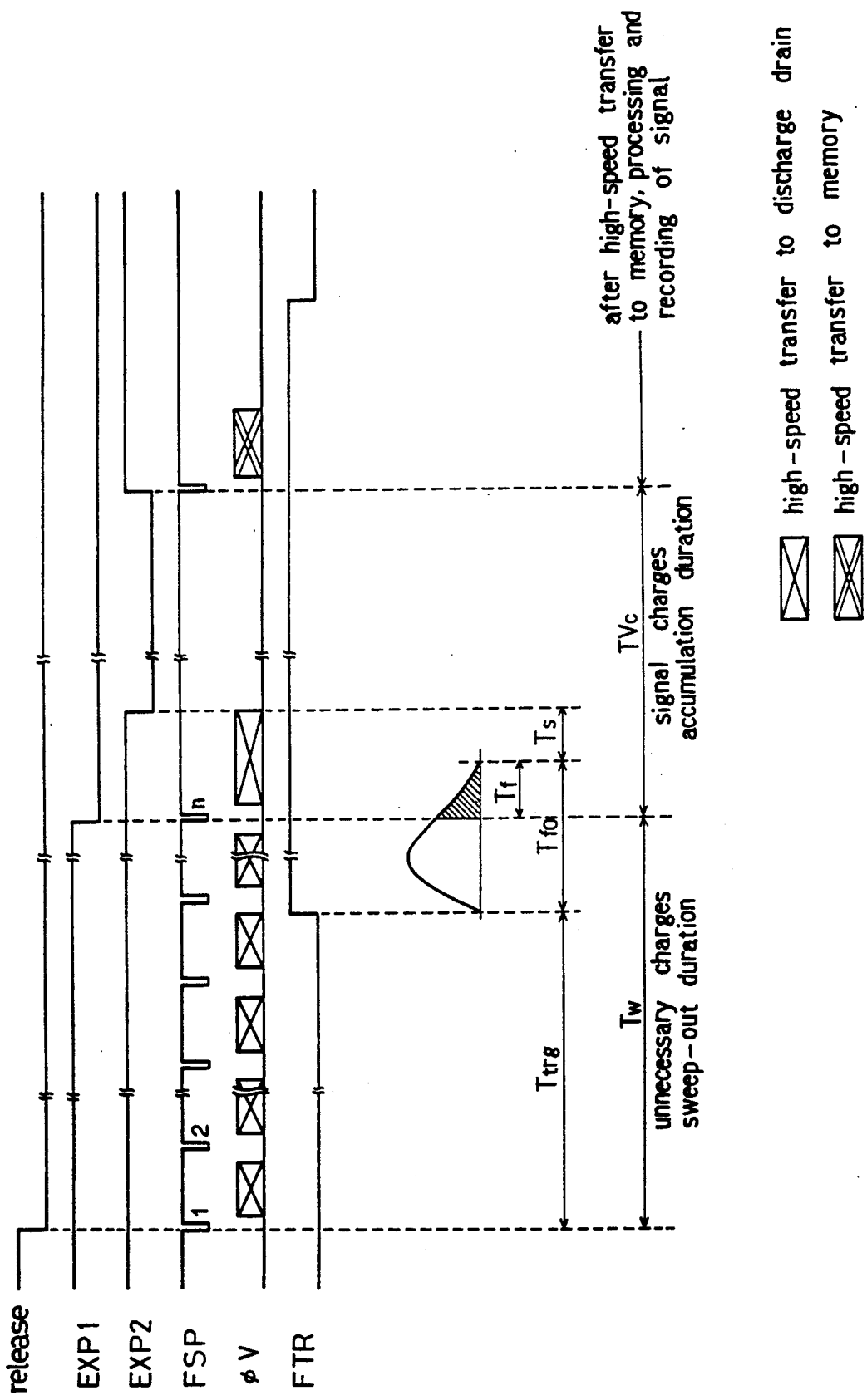

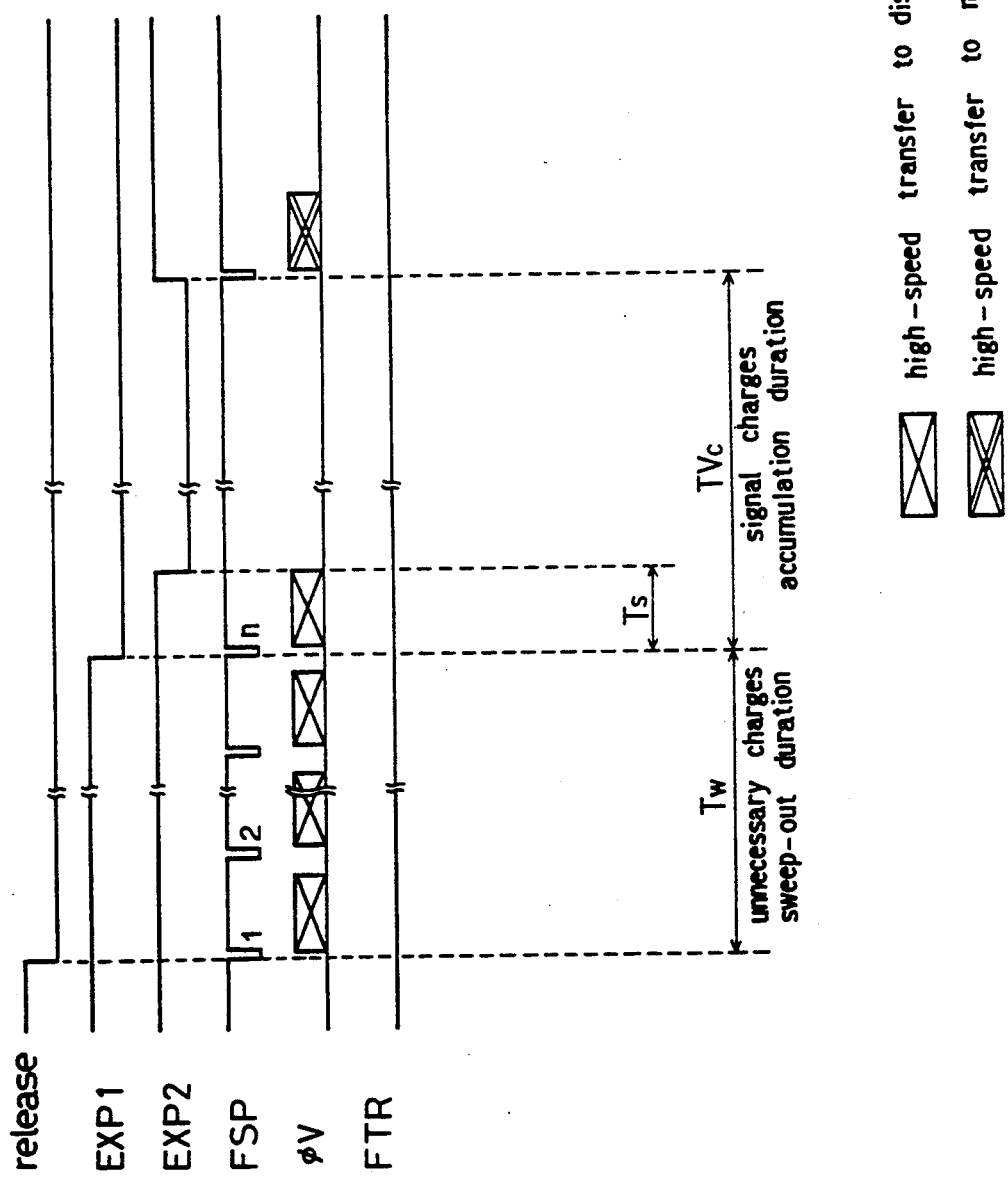

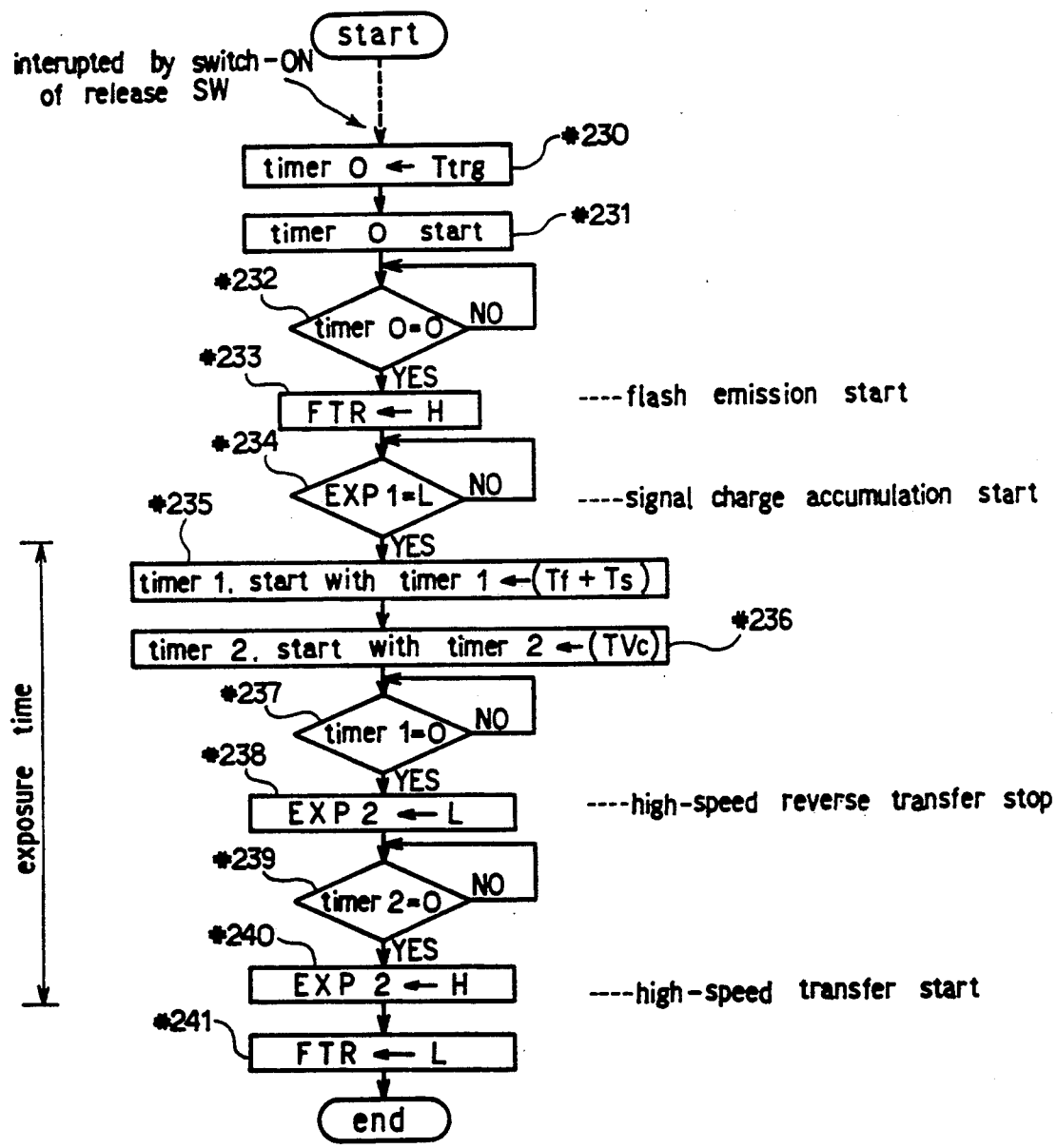
FIG. 11-a

FIG. 11-b
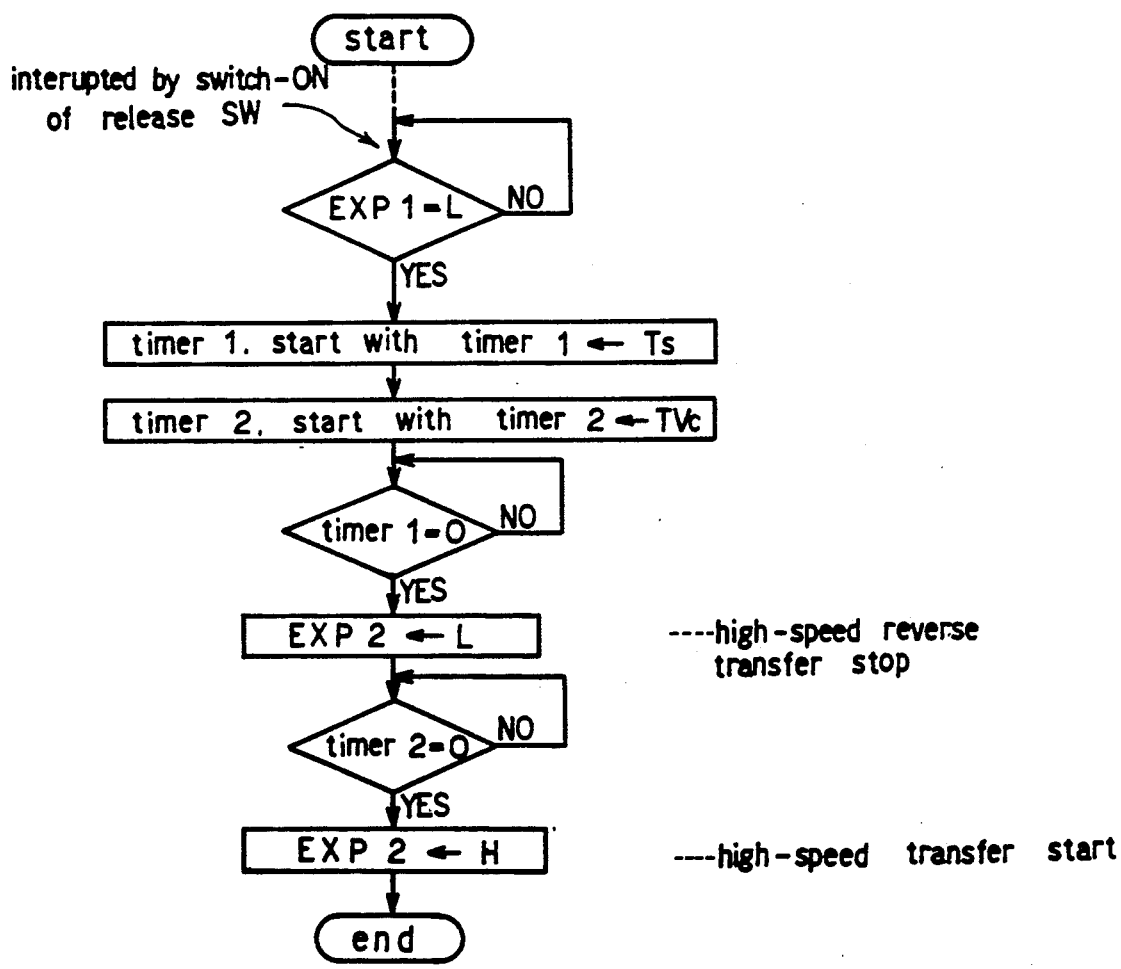

EXPOSURE CONTROL DEVICE FOR STILL VIDEO CAMERA

BACKGROUND OF THE INVENTION AND RELATED ART STATEMENT

The present invention relates to an exposure control device for a still video camera containing an imaging device such as a CCD sensor capable of shutter control.

In a still video camera provided with so-called CCD shutter control, concerning emission timing of a flash light and accumulating time of signal charges to the CCD sensor, as disclosed in European Patent Application Publication No. 280511, for instance, emission timing of a flash light is previously determined corresponding to brightness of an object and flash light is fully emitted at a predetermined timing after starting to accumulate the signal charges. When proper exposure is attained, the accumulation of the signal charges is terminated and the signal charges are transferred to a transfer section of the CCD sensor.

Also as described in U.S. Pat. No. 4,635,123, a flash light is emitted at a given moment after starting to accumulate the signal charges and when proper exposure is attained, the flash lighting is forcedly stopped, then accumulation of the signal charges is terminated and the signal charges are transferred to the transfer section.

However, the former induces smear due to the accumulation of unnecessary charges occurring while the electronic flash remains emitting after transferring the signal charges to the transfer section, which causes deterioration in image quality.

Also in the latter case, due to unnecessary charges in the transfer section are not removed immediately before transferring the signal charges to the transfer section, it is not well to remove smear caused by flash light.

In such a known manner that the accumulated charges are transferred to a vertical transfer section during the flash lighting or in response to the timing of forcedly stopping the emission of flash light, unnecessary charges in the vertical transfer section are mixed up with the signal charges to produce smear and lower the image quality.

Although, the devices described in the above prior art need to have a sequence of flash lighting at a given moment after starting to accumulate the signal charge for attaining a picture in which both the available light and the flash light properly contribute, it is expected to provide a device in which both the available light and the flash light can contribute to get a proper exposure even if the flash light is emitted at the instant of the starting to accumulate the signal charges.

Furthermore, the prior art fails to control the flash light by using a distance information for exposure control by CCD shutter function, disregarding that the affecting amount of flash light for exposure varys corresponding to an object distance.

SUMMARY OF THE INVENTION

For overcoming the foregoing disadvantages, the present invention is directed towards an exposure control device for a still video camera in which signal charges are transferred when signals causing smear have been removed by sweeping out unnecessary charges from the vertical transfer section after the completion of flash emission, so that no affection of flash light is expected on the signal charges transferred to the transfer section and thus, a deterioration in image quality caused by smear can be prevented.

It is another object of the present invention to provide an exposure control device for a still video camera having exposure control with a sequence of starting the flash emitting at the same time of starting the accumulation of signal charges, in which a proper exposure time determined by ambient light can be ensured and the amount of flash light contributes to the proper exposure.

It is a further object of the present invention to provide an exposure control device for a still video camera adapted to determine the amount of flash light which contributes to the exposure based on an object distance information for ensuring proper exposure.

It is still another object of the present invention to provide an exposure control device for a still video camera capable of controlling the exposure by determining a period of overlapping between the emitting duration of a flash light and the accumulating duration of signal charges based on an object distance information.

BRIEF DESCRIPTION OF THE DRAWINGS

FIG. 2-a is a diagram showing the operational timing of Embodiment 1;

FIG. 2-b is a diagram showing the exposure timing of Embodiment 1 under highly bright, normal light conditions;

FIGS. 3-a and 3-b are flow charts showing the sequence of light measurements calculation according to Embodiment 1;

FIGS. 4-a and 4-b are flow charts showing the sequence of exposure procedures under flash light conditions according to Embodiment 1;

FIG. 4-c is a flow chart showing the sequence of exposure procedures under highly bright, normal light conditions according to Embodiment 1;

FIG. 9-a is a diagram showing the operational timing of Embodiment 3;

FIG. 9-b is a diagram showing exposure timing of Embodiment 3 under highly bright, normal light conditions;

FIG. 11-a is a flow chart showing the sequence of exposure procedures according to Embodiment 3;

FIG. 11-b is a flow chart showing the sequence of exposure procedures under highly bright, normal light conditions according to Embodiment 3;

DETAILED DESCRIPTION OF PREFERRED EMBODIMENTS

Embodiment 1

Figure 1:
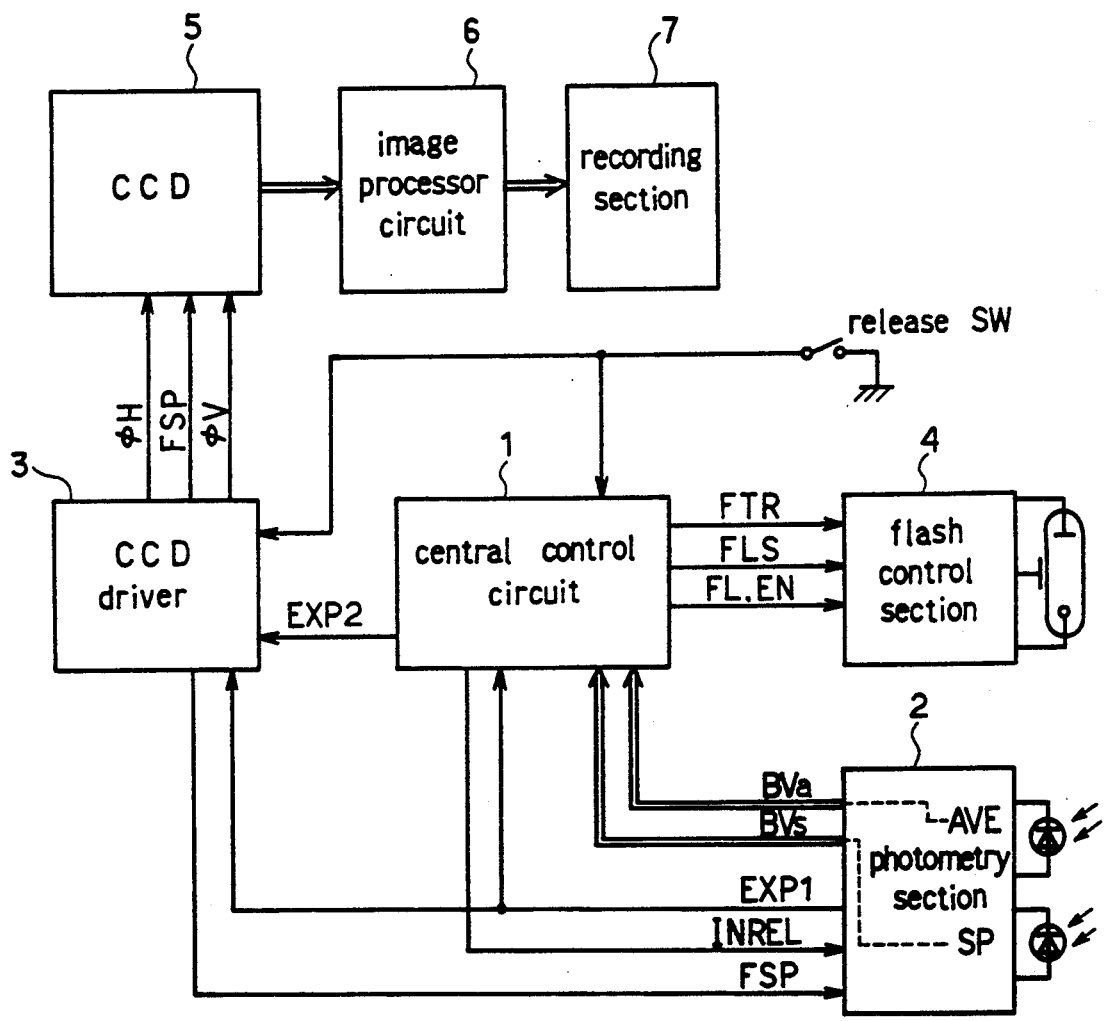
FIG. 1 is a block diagram according to Embodiments 1 and 2 of the present invention.

FIG. 1 illustrates an arrangement of an exposure control device according to Embodiment 1 of the present invention which will be described hereinafter.

There is provided a central control circuit 1 for controlling the device, including a plurality of timers for time control of signal outputs for controlling. The central control circuit 1 performs a predetermined arithmetic operation in accordance with the data of brightness information derived from a photometry section 2 and controls a CCD driver 3 and a flash control section 4 based on the calculated results.

The photometry section 2 carries out pre-phototaking photometry upon receiving a control signal from the central control circuit 1 and sends back to the central control circuit 1 the resultant measurements in the form of values of background brightness BVa and a main object brightness BVs. At a time of phototaking, the photometry section 2 receives an INREL signal from the central control circuit 1 and an FSP signal from the CCD driver 3 and then, outputs an EXP1 signal capable of a light-emission-quantity-control to the central control circuit 1 and the CCD driver 3.

The CCD driver 3 when receiving an EXP2 signal outputted from the central control circuit 1 and the EXP1 signal from the photometry section 2, controls the accumulation of signal charges and the sweep-out of unnecessary charges in a CCD 5, and after the accumulation of the signal charges, activates the transfer of signals to a memory and the synchronous transfer of the same to an image processor circuit 6.

The flash control section 4 controls flash emitting, corresponding to flash emitting signals FTR, flash stop signals FLS, and flash emitting enable signals FL.EN outputted from the central control circuit 1. The CCD 5 of solid imaging device is actuated by the CCD driver 3 and then, the signal charges accumulated in the CCD 5 are processed as image signals by the image processor circuit 6. The signals processed in the image processor circuit 6 are transferred to a recording section 7 for recording still video signals onto e.g. a floppy disk.

The respective control signals will be described in detail.

RELEASE signal: a signal for starting the sequence of exposure procedures, triggered at a decay from H(high) to L(low) when a shutter release button switch SW is closed.

INREL: a signal for starting the light-emission-quantity-control in the photometry section 2, triggered from H to L when the time Tw has elapsed, which is needed for (n−1) times sweeping out unnecessary charges by high-speed reverse transfer, after being the RELEASE signal from H to L.

FSP: a pulse signal for transferring the charges accumulated in a photoelectric converting section to a vertical transfer CCD.

EXP1: a signal for controlling the start timing of accumulation of charges and instructing the stop of flash light emission when the proper exposure is attained, (i.e. light-emission-quantity-control.)

EXP2: a signal for providing the stop timing of high-speed reverse transfer and the start timing of high-speed transfer.

$\phi$V: a pulse signal for driving the vertical transfer CCD.

FTR: a signal for providing the timing of flash light emission, triggered at a rise from L to H.

FLS: a signal for providing the stop timing of flash light emission.

FL.EN: a signal for permitting the emission of flash light, which will be on at the state of H and off at L.

BVa: a value of brightness in a background measured by the photometry section 2.

BVs: a value of brightness on a main object measured by the photometry section 2.

The sequence of exposure procedures with the use of flash light according to Embodiment 1 will then be described referring to FIGS. 1, 2, and 4.

When the release button switch SW is closed, the CCD driver 3 outputs FSP and $\phi$V pulses to transfer unnecessary charges to the vertical transfer CCD with the FSP pulses. Then, the sweep-out of the unnecessary charges to a drain starts operating through high-speed reverse transfer with the $\phi$V pulses and will be repeated. Simultaneously, the central control circuit 1 is interrupted by actuating the release button switch SW and stays in wait with its timer 0 counting the time Tw required for repeating (n−1) times sweep-out actions to ensure the elimination of unnecessary charges by the high-speed reverse transfer (#21, 22, and 23).

When the timer 0 counts up as the time Tw has elapsed, the INREL signal is turned to L (#24). As synchronizing with a decay of the first FSP pulse (for n-th sweep-out action) after changing of the INREL signal to L, the EXP1 signal from the photometry section 2 is shifted from H to L and the spot light metering is started. At the time, the unnecessary charges transferred to the vertical transfer CCD with the FSP pulses are swept out to a discharge drain by the high-speed reverse transfer (shutter is open). Corresponding to the decay of the EXP1 signal, the CCD driver 3 outputs no FSP pulse signal after outputting of the n-th FSP pulse signal till the EXP2 signal shifts to H.

Thereafter, the reverse transfer continues until the EXP2 signal turned from L to H is outputted from the central control circuit 1, and sweep out smear factor (unnecessary charges) produced in the vertical transfer CCD. When the EXP1 signal is shifted from H to L (#25), the central control circuit 1 starts calculating a substraction with setting to the timer 1, a value Ttrg obtained by a pre-phototaking photometry (#26 and 27). When the timer 1 counts down to zero, the FTR signal is shifted from L to H and enable the electronic flash to start emitting (#28). Then, the photometry section 2 shifts the EXP1 signal to from L to H at the moment when an exposure of an area about a main object reaches a proper amount of light. As the EXP1 signal is turned from L to H (#29), the central control circuit 1 shifts the FLS signal from L to H, and stops the flash emitting, and sets to the timer 2 a time Ts for executing one time high-speed reverse transfer from the vertical transfer CCD, then, starts counting of timer 2 (#30). When the timer 2 counts down to zero (#31), the EXP2 signal is turned from L to H (#32) and thus, the CCD driver 3 stops operating of the high-speed reverse transfer. After a time ΔT from the stop of high-speed reverse transfer to the ready state of a potential in the vertical transfer CCD for transferring the charges, the FSP pulse shifted from H through L to H is produced and the accumulated signal charges are transferred to the vertical transfer CCD (shutter is closed).

Then, the signal charges are further transferred to a memory in the CCD 5 with the $\phi V$ pulse, and sent to the image processor circuit 6 synchronizing with an image synchronous signal (i.e. read out of image signals).

After the EXP2 signal shifted to H, the INTEL signal is shifted from L to H, the EXP2 signal from H to L, the FTR signal from H to L, and the FLS signal from H to L, that is, all the signals are returned to their respective initial states before phototaking (#33) (i.e. the end of exposure sequence).

The sequence of calculation from the photometry according to Embodiment 1 will be described referring to FIG. 3.

Provided that $\alpha$ designates a difference in brightness between the pre-photometry values BVs and BVa [APEX value] transmitted from the photometry section 2 to the central control circuit 1 (#1) when $\alpha < 2$, it is determined that the object is in a back light state since the brightness of a main object is 2 Ev under than the background brightness (#2) and the sequence goes to #9. When $\alpha \geq 2$, it is determined that the object is in a front light state and the mean value between BVa and BVs is obtained as BVc (#3). The shutter speed TV is calculated from the brightness BVc, the sensitivity SVc of the CCD, and a aperture value AVc of optical system (#4). It is then determined whether the resultant shutter speed TV is faster than a limiting shutter speed TVh for avoiding camera shake (#5). If the shutter speed TV is faster than TVh, the flash emitting enable signal is turned to L to inhibit flash emitting and the exposure with the ambient light is performed (#8).

If the shutter speed TV is slower than the camera-shake limiting speed TVh, the flash emitting timing Ttrg is obtained as a duration after the EXP1 signal is turned from H to L, Ttrg is calculated by subtracting from the camera-shake limiting time $2^{-TVh}$ a time Ts corresponding to a duration for one time sweep-out of unnecessary charges from the vertical transfer CCD, a waiting time $\Delta T$ for having the potential stabilized to alter the vertical transfer CCD from high-speed reverse transfer to high-speed transfer, and a time Tf0 for full flash emitting (#6). This is because if $Ttrg = 2^{-TVh}$, the period of exposure will be increased by $Ts + \Delta T$ as the signal charges are continuously accumulated during Ts and $\Delta T$ as shown in FIG. 2. Thus, it is needed for substraction of $Ts + \Delta T$ and also, for consideration of the flash emitting duration to prevent the exposure time from exceeding the camera-shake limiting time. After calculation of Ttrg, the flash emitting enable signal FL.EN is turned to H allowing the electronic flash to emit light.

When it is judged at #2 that the object is in a back light state, the shutter speed TV is determined so that the background object becomes 1 Ev over-exposure (#9). If the speed Tv is slower than the camera-shake limiting shutter speed Tvh ("yes" at #10), the flash emitting timing Ttrg is expressed as:

$$Ttrg = 2^{-TVh} - Tf0 \quad (\#11).$$

Then, if the speed Tv is faster than the limiting shutter speed TVh ("no" at #10), Ttrg is obtained from:

$$Ttrg = 2^{-Tv} - Ts - \Delta T - Tfo \quad (\#12)$$

wherein compensation about the time $Ts + \Delta T$ and the flash emission duration Tf0 is made. After obtaining of Ttrg, the flash emitting enable signal FL.EN is turned to H, permitting the electronic flash to emit light.

FIG. 3-b is a flow chart showing that the flash light is emitted at the same time as the start of accumulation of the signal charges when the time for accumulating the signal charges is short as the background is considerably bright. FIG. 4-b is a flow chart for limiting the exposure (accumulation) time to $2^{-TVh}$ depended on the camera-shake limiting time when a proper exposure is realized even by emitting the flash light. FIG. 4-c illustrates a sequence of exposure procedures at high brightness, front light state according to Embodiment 1.

Embodiment 2

Figure 5:
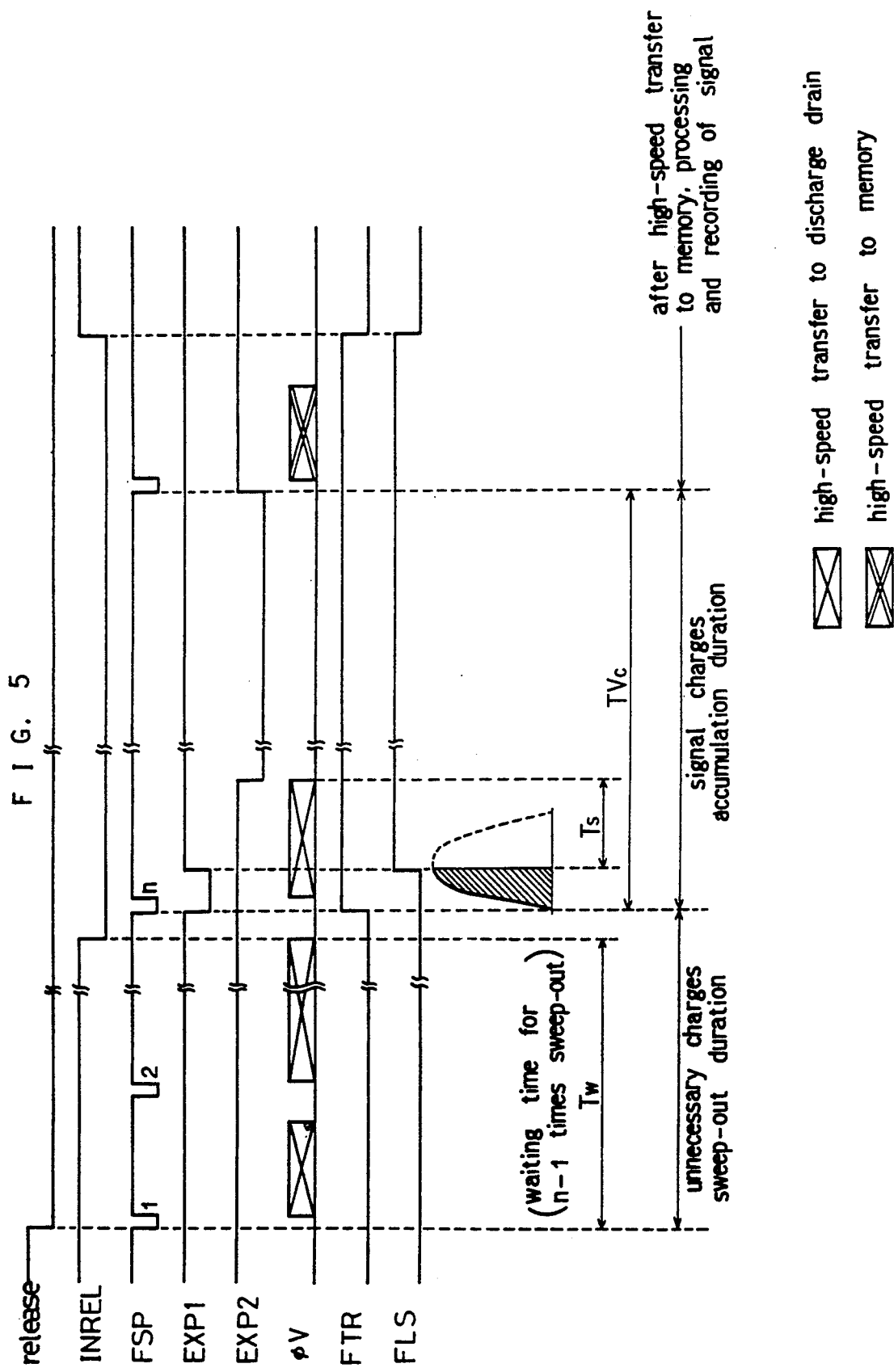
FIG. 5 is a diagram showing the operational timing of Embodiment 2.
Figure 7:
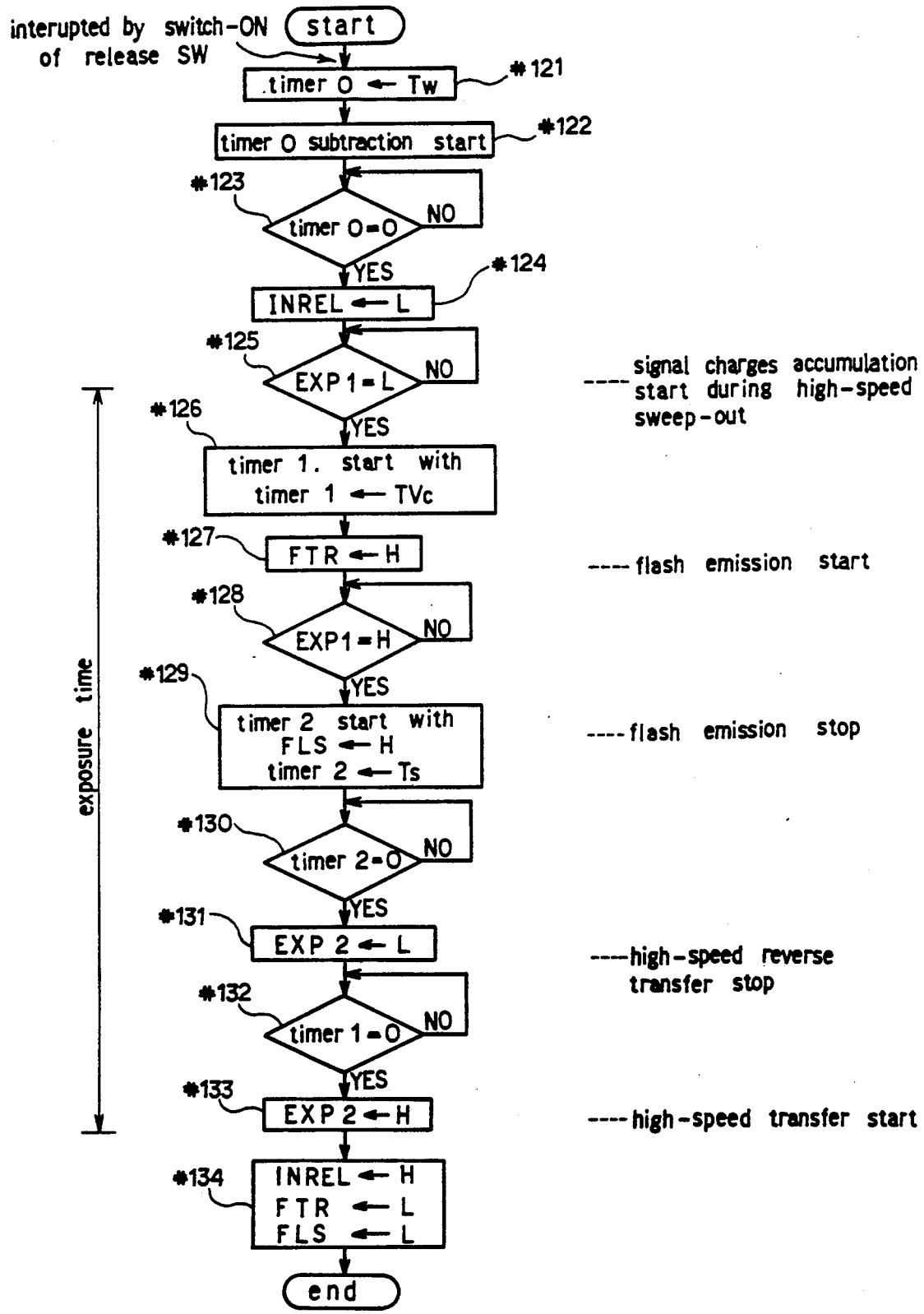
FIG. 7 is a flow chart showing the sequence of exposure procedures under flash light conditions according to Embodiment 2.

The sequence of exposure procedures with flash emission according to Embodiment 2 of the present invention will then be described referring to FIGS. 1, 5, and 7.

When the release button switch SW is closed, the CCD driver 3 in FIG. 1 outputs FSP and $\phi V$ pulse to transfer unnecessary charges accumulated in the photoelectric converting section of the CCD 5 to the vertical transfer CCD with the FSP pulses. Then, the sweep-out of the unnecessary charges to a discharge drain is carried out through high-speed reverse transfer with the $\phi V$ pulses. At the time, the central control circuit 1 is interrupted by the actuation of the release button switch SW and remains in wait with its timer 0 counting the time Tw needed for repeating $(n-1)$ times sweep-out actions to ensure the elimination of unnecessary charges by the high-speed reverse transfer (#121, 122, and 123).

When the timer 0 counts up as the time Tw has elapsed, the INREL signal is turned to L (#124). As synchronizing with a decay in the first FSP pulse (for an n-th sweep-out action) after change of the INREL signal to L, the EXP1 signal from the photometry section 2 is shifted from H to L and the process of spot photometry starts (#125). Simultaneously, the unnecessary charges transferred to the vertical transfer CCD with the FSP pulses are swept out to a discharge drain by the high-speed reverse transfer. Corresponding to the decay of the EXP1 signal, the CCD driver 3 outputs no FSP pulse after outputting the n-th FSP pulse signals until the EXP2 signal shifts up from L to H (shutter is open).

At the time when the EXP1 signal is shifted down from H to L, in the central control circuit 1 sets to the timer 1 the result TVc (accumulation duration) determined by calculation of the photometry, and then starts the timer 1 counting (#126) and simultaneously, turns the FTR signal to H to start the flash emitting (#127). When a proper exposure on the main object is attained, the photometry section 2 shifts the EXP1 signal from L to H (#128). Corresponding to the rise, the central control circuit 1 shifts the FLS signal to H to stop the flash emitting and also, sets its timer 2 with the time Ts for executing one time high-speed reverse transfer from the vertical transfer CCD, then, starts the timer counting (#129). After the timer 2 counts down to zero (#130), that is, when the time Ts has elapsed, the EXP2 signal turns from H to L (#131). Then, the CCD driver 3 stops the high-speed reverse transfer in response to the decay of the EXP2 signal.

Thereafter, the central control circuit 1 waits the timer 1 counts up (#132) and shifts the EXP2 signal from L to H when the count of timer 1 becomes zero (#133). Corresponding to the rise of the EXP2 signal, the CCD driver 3 outputs the FSP pulse shifted from H through L to H to transfer the accumulated signal charges to the vertical transfer CCD (shutter is closed). The signal charges transferred to the vertical transfer CCD is further transferred to a memory with the $\phi V$ pulses and processed through the image processor circuit 6 in synchronization with an image synchronous signal. After the EXP2 signal shifts to H, signals are returned back to the pre-phototaking initial states; INREL to H, FTR to L, and FLS to L (#134) (i.e. the sequence of exposure procedures is completed).

The fastest shutter speed will be described.

According to Embodiments 1 and 2, the high-speed reverse transfer continues to operate for a duration of the time Ts for one time sweep-out in the vertical transfer CCD in order to eliminate smear factor from the vertical transfer CCD after stopping the flash emission. Also, it is needed to have the time $\Delta T$ from the stop of high-speed reverse transfer to the state in which the read-out of signals by high-speed transfer is ready for execution or more particularly, the potential of the vertical transfer CCD is ready for receiving the signal charges. The shutter speed is thus limited by a time of $Ts + \Delta T$ and becomes (time of which EXP1 is in L state)+$(Ts + \Delta T)$ time.

In Embodiment 2, the high-speed reverse transfer may be carried out with remaining the EXP2 signal at H during the time $TVc - \Delta T$.

Figure 6:
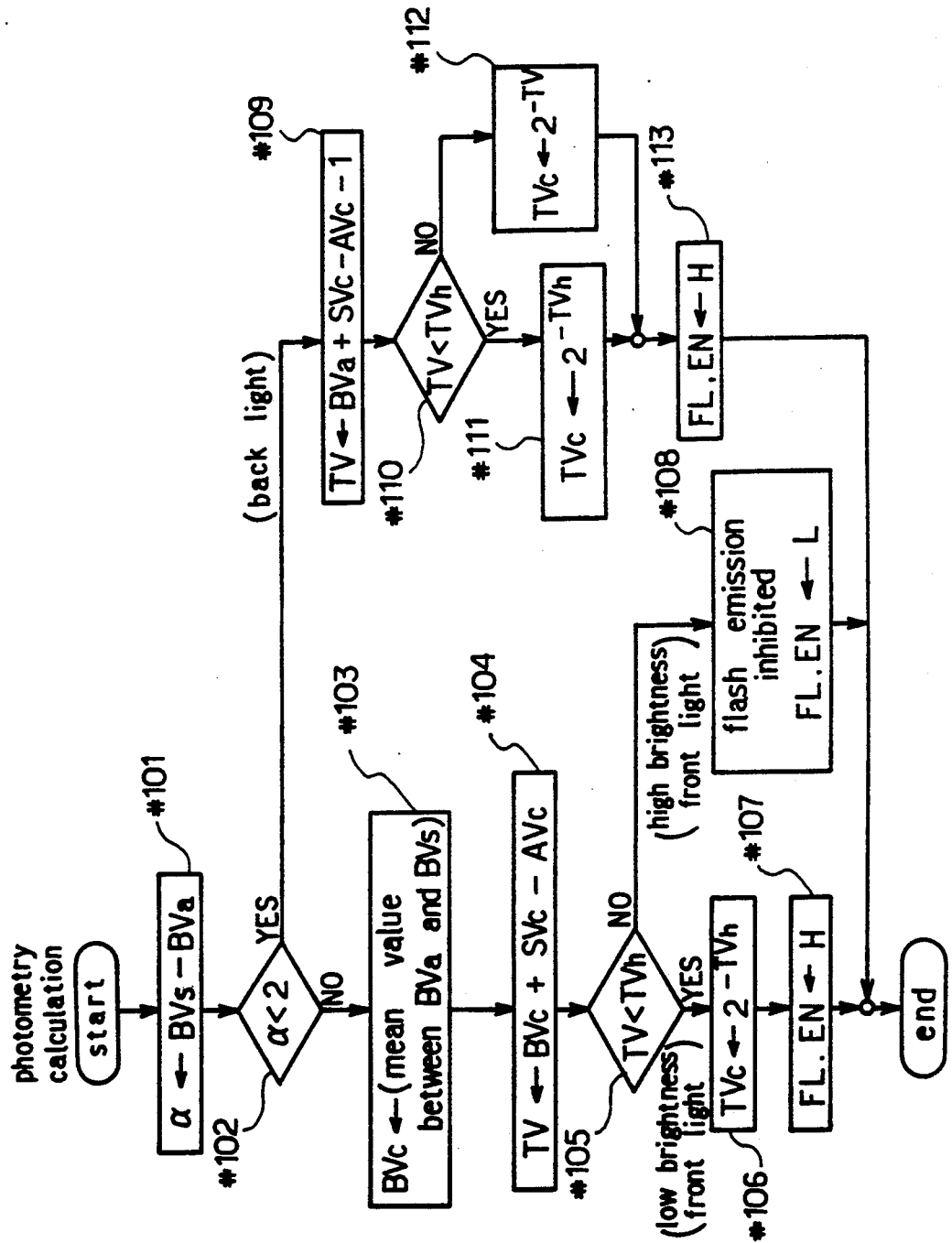
FIG. 6 is a flow chart showing the sequence of light measurements calculation according to Embodiment 2.

The sequence of calculation of photometry according to Embodiment 2 will then be described referring to FIG. 6.

From the results of pre-photometry inputted from the photometry section 2 in FIG. 1, the difference between the main object brightness BVs and the background brightness BVa is calculated and designated as $\alpha$ (#101). When $\alpha < 2$ or the main object brightness is less 2 Ev under than the background, it is determined that the object is in a back light state and if not, it is judged that the object is in a front light state (#102). When a front light state, the mean value between BVa and BVs is calculated as BVc (#103). The shutter speed TV is then obtained from the mean brightness BVc, the sensitivity SVc of the CCD, and the aperture value AVc of optical system (#104). It is judged whether the resultant speed TV is faster than a camera-shake limiting shutter speed TVh (#105). If the shutter speed TV is faster than TVh, the flash emitting enable signal FL.EN is turned to L to inhibit flash emitting and the exposure with the ambient light is performed (#108). If the speed TV is slower than the limiting speed TVh, the accumulating time of signal charges or exposure time TVc is determined as $TVc = 2^{-TVh}$ (#106), and the FL.EN signal is turned to H enabling the flash emission and phototaking (#107).

When it is judged at the step of #102 that the object is in a back light state, the shutter speed TV is determined so that the background becomes 1 Ev over exposure (#109). If TV is faster than the camera-shake limiting shutter speed TVh, $2^{-TV}$ is determined as the exposure time TVc and if slower, $2^{-TVh}$ (#110, 111, and 112). As phototaking in the back light state, the FL.EN signal is turned to H enabling the flash emission (#113).

Embodiment 3

Figure 8:
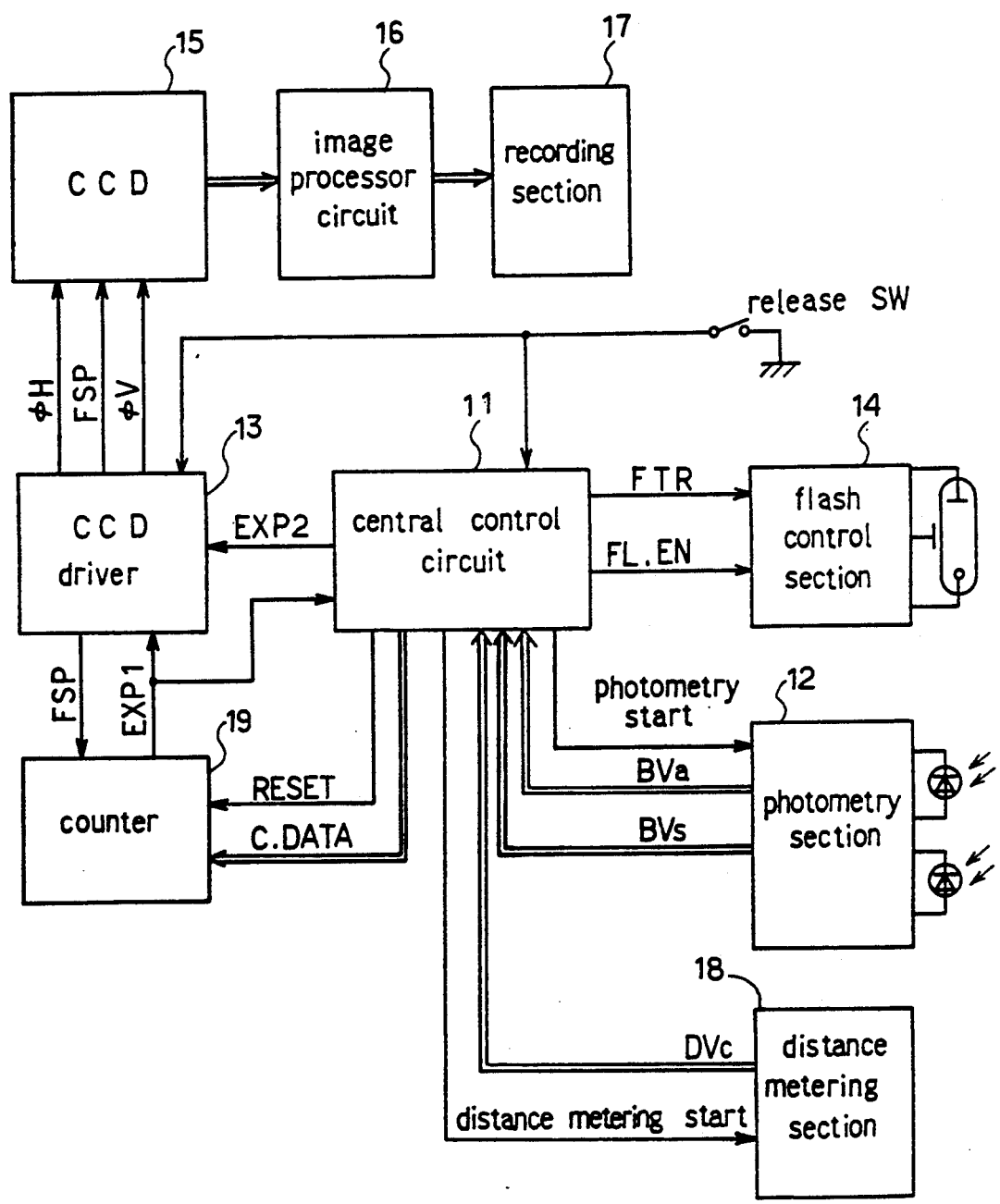
FIG. 8 is a block diagram according to Embodiment 3.

FIG. 8 illustrates the arrangement of Embodiment 3 which will be described hereinafter.

There is provided a central control circuit 11 for control of a photometry section 12 and a distance metering section 18. Prior to phototaking, the central control circuit 11 receives brightness data of a main object brightness BVs and background brightness BVa from the photometry section 12 and also, a value DVc representing the distance to an object from the distance metering section 18. The central control circuit 11 contains a plurality of timers (timer 0, timer 1, and timer 3) and is adapted for time control of the control signal outputs to a CCD driver 13 and a flash control section 14 in phototaking. Also, the central control circuit 11 is connected to a counter 19 for setting of the counting number with C. DATA information so that FSP pulses from the CCD driver 13 can be counted.

The photometry section 12 when instructed by the central control circuit 11 returns the photometry data of BVs and BVa to the central control circuit 11.

In accordance with an ON signal from the release button switch SW, an EXP2 signal from the central control circuit 11, and an EXP1 signal from the counter 19, the CCD driver 13 controls to accumulate signal charges and sweep-out unnecessary charges in a CCD 15 and to transfer the accumulated signal charges to a memory and further, send it to an image processor circuit 6.

The flash control section 14 upon receipt of an FL.EN signal and an FTR signal from the central control circuit 11 actuates the electronic flash to emit light as accepting the FTR signal when the FL.EN signal is at the state of H, and disable the electronic flash to emit light as inhibiting the FTR signal when the FL.EN is at L. Also, a solid imaging device (CCD 15) is actuated by the CCD driver 13 and subsequently, the image processor circuit 16 starts processing the signal charges accumulated in the CCD 15 as image signals. The image signals processed through the image processor circuit 16 are then recorded by a recording section 17 onto a floppy disk of still video. The distance metering section 18 starts measuring the focused distance on receipt of a distance measuring start signal from the central control circuit 11 and outputs the resultant measured value DVc to the central control circuit 11. The counter 19 is reset when receiving a RESET signal from the central control circuit 11 and starts counting the number of pulses in the FSP signal from the CCD driver 13. When the number of the FSP signal pulses becomes equivalent to a set value as C. DATA directed from the central control circuit 11, the EXP1 signal shifts from H to L. The EXP1 signal becomes H state at reset time.

The sequence of exposure procedures with flash emission according to Embodiment 3 will be described referring to FIGS. 8, 9, and 11.

When the release button switch SW is switched on, the CCD driver 13 outputs FSP and $\phi V$ pulse to transfer the unnecessary charges accumulated in a photoelectric converting section of the CCD 15 to the vertical transfer CCD with the FSP pulses. Then, the sweep-out of the unnecessary charges to a discharge drain starts operating through high-speed reverse transfer with the $\phi V$ pulses and will be repeated. Simultaneously, the central control circuit 11 is interrupted by the actuation of the release button switch SW and sets its timer 0 with a flash emitting timing Ttrg calculated from photometry and starts the timer 0 counting (#230 and 231). When the timer 0 counts down to zero as the time Ttrg has elapsed after actuating the release button switch SW, the FTR pulse is shifted from L to H enabling the flash to emit (#233).

The counter 19 counts the number of FSP pulse and in synchronizing with decay of the n-th FSP pulse from the actuation of the release button switch SW, shifts the EXP1 signal from H to L (#234). Corresponding to the decay of the EXP1 signal, the central control circuit 11 sets its timer 1 with (Tf+Ts), and its timer 2 with Tvc, and makes both start to operate (#235 and 236) (shutter is open). Also, corresponding to the decay of the EXP1 signal, the CCD driver 13 stops outputting FSP pulse after outputting the n-th FSP pulse until the EXP2 signal is shifted from L to H.

Meanwhile, Tf represents a time of flash emitting calculated from the photometry, Ts is a required time for carrying out one sweep-out action of unnecessary charges from the vertical transfer CCD, and TVc is an accumulation time of signal charges calculated from the photometry.

The central control circuit 11 makes the timers 1 and 2 start and waits the count of timer 1 becomes zero (#237). When the count timer 1 becomes zero as the time of (Tf+Ts) has elapsed, the EXP2 signal is shifted from H to L (#238). At the same time, the CCD driver 13 stops outputting the $\phi V$ pulse to stop the high-speed reverse transfer. The central control circuit 11 waits for the timer 2 to count down to zero (#239) and when the content of timer 2 becomes zero, shifts the EXP2 signal from L to H (#240). Corresponding to the decay of the EXP2 signal, the CCD driver 13 outputs the FSP pulse to transfer the signal charges accumulated to the vertical transfer CCD (shutter is closed).

The signal charges transferred to the vertical transfer CCD is then transferred to the memory with the $\phi V$ pulses, and after being processed as image signals through the image processor circuit 16, recording is executed. Finally, the FTR signal is turned to the original state of L and the sequence of exposure procedures is thus completed.

The fastest shutter speed will then be described.

According to Embodiment 3, the high-speed reverse transfer is continued to operate for a time Ts for sweep-out one time unnecessary charges in the vertical transfer CCD in order to eliminate smear factor from the vertical transfer CCD when the time Tf has elapsed from the start of accumulation of signal charges and more specifically, after stopping the flash emission. After stopping the high-speed reverse transfer, it is needed to have the time $\Delta T$ for allowing the potential in the vertical transfer CCD to be ready for transferring thereto the accumulated signal charges from the photoelectric converting section.

Thus, as the fastest shutter speed is restricted by (Ts+$\Delta T$), and it becomes (Tf+Ts+$\Delta T$).

Figure 10:
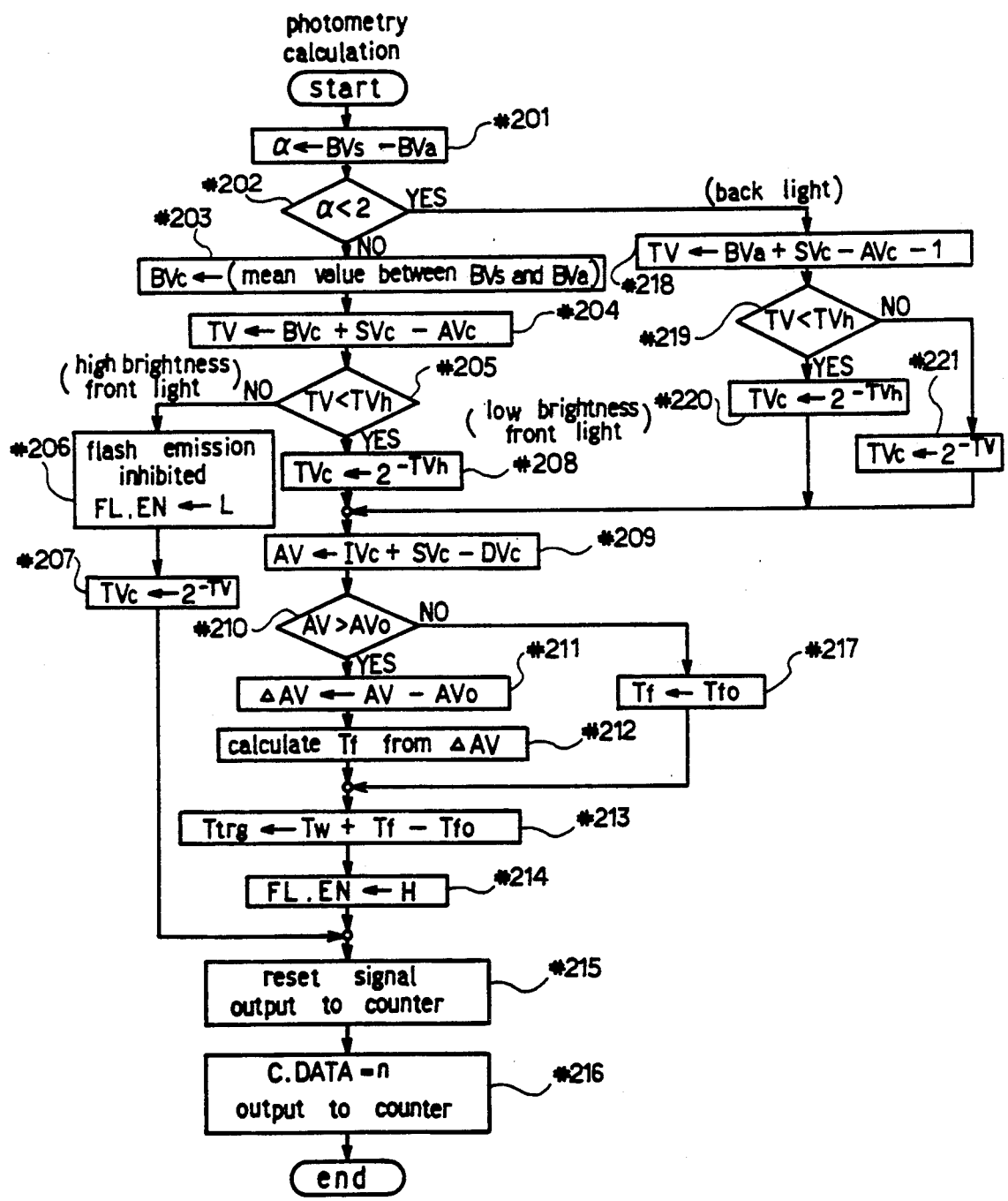
FIG. 10 is a flow chart showing the sequence of light measurements calculation according to Embodiment 3.

The sequence of calculation of photometry according to Embodiment 3 will then be described referring to FIG. 10.

Based on the results of pre-phototaking photometry inputted from the photometry section 12 in FIG. 8, the difference between the main object brightness BVs and the background brightness BVa is calculated and designated as $\alpha$ (#201). When $\alpha < 2$ or brightness of the main object is less 2 Ev under than the background, it is determined that the object is in a back light state, and if not, it is determined that the object is in front light state (#202).

When it is determined that the object is in front light state, the means value between BVa and BVs is calculated as BVc (#203). The shutter speed TV is then obtained from the mean brightness BVc, the sensitivity SVc of the CCD, and the aperture value AVc of optical system (#204). It is further judged whether the resultant speed TV is faster than a camera-shake limiting shutter speed TVh for avoiding camera shake (#205). If the shutter speed TV is faster than TVh, $TVc = 2^{-TV}$ is set, and then the flash emitting enable signal FL.EN is turned to L to inhibit flash emitting and the phototaking with ambient light is executed (#206 and 207). If the speed TV is slower than the speed TVh, $2^{-TVh}$ is substituted for TVc and the sequence subsequent to the step of #209 will be carried out. TVc represents a time of accumulation of charges in the CCD.

When it is judged at the step of #202 that the object is in a back light state, the shutter speed TV is determined so that the background becomes 1 Ev over exposure (#218). If the speed TV is faster than the camera-shake limiting shutter speed TVh, $2^{-TV}$ is set as TVc and if slower, $2^{-TVh}$ is set, and then, the sequence subsequent to the step of #209 will be carried out (#219, 220, and 221).

Subsequent to the step #209, there are sequences for determining the timing of flash emission. First, the proper aperture value AV is calculated from the flash emitting guide number IVc, the CCD sensitivity SVc, and the focused distance data DVc inputted from the distance metering section (#209). The value AV is compared with the open aperture value of optical system AV0 (#210). If $AV \leq AV0$, a full flash emitting time Tf0 is set as the flash emitting time Tf since the distance to the object is too far to cover with the flash light (#217). If $AV > AV0$, the difference $\Delta AV$ between the proper aperture value AV and the open aperture value AV0 is then calculated (#211). As the characteristics of the flash emission have been acknowledged, the flash emitting time Tf can be obtained corresponding to $\Delta AV$ (#212). The time Ttrg extending from the actuation of the release button switch SW to the flash emission is thus calculated from the emitting time Tf, the full flash emission time Tf0, and the time Tw needed for sweep-out of the unnecessary charge (#213) from the actuation of the release button switch SW. Then, the FL.EN signal is turned to H allowing the electronic flash to emit light (#214).

The central control circuit 11 outputs a RESET signal for resetting the counter 19. The counter 19 turns the EXP1 signal to H at reset time. After resetting the counter 19, the central control circuit 11 sets the counter 19 with the number n of FSP pulses as C.DATA information (#216).

FIGS. 9-b and 11-b show the timing and sequence of exposure procedures respectively operable at a high bright, front light state according to Embodiment 3.

Embodiment 4

Figure 12:
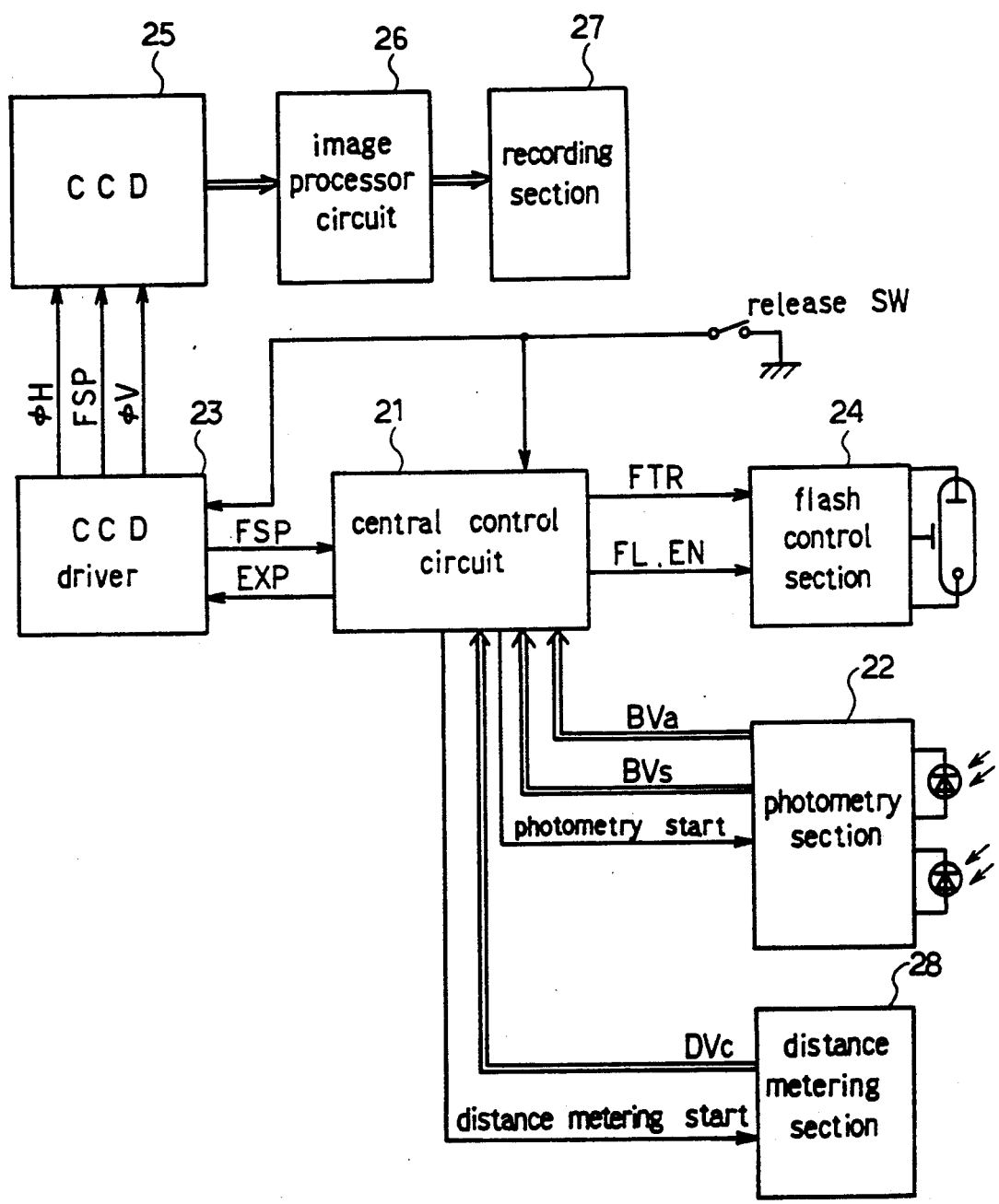
FIG. 12 is a block diagram according to Embodiment 4.

FIG. 12 illustrates the arrangement of Embodiment 4 which will be described hereinafter.

There is provided a central control circuit 21 for controlling a photometry section 22 and a distance metering section 28. Prior to phototaking, the central control circuit 21 receives data of a main object brightness BVs and background brightness BVa from the photometry section 22 and also, a value DVc representing the distance to an object from the distance metering section 28, and determines a proper exposure time and timing of flash emission based on the above data. The central control circuit 21 contains a plurality of timers (timer 0, timer 1, and timer 3) and is adapted for time control of the outputs to a CCD driver 23 and a flash control section 24.

The photometry section 22 when instructed by the central control circuit 21 sends back the photometry data of BVs and BVa to the central control circuit 21.

Corresponding to an ON signal from the release switch SW and an EXP signal from the central control circuit 21, the CCD driver 23 controls an accumulation of signal charges in the CCD 25, sweep-out of unnecessary charges, and transfer of the signal charges after accumulation thereof.

The flash control section 24 upon receipt of an FL.EN signal and an FTR signal from the central control circuit 21 actuates an electronic flash to emit light as accepting the FTR signal when the FL.EN signal is at H, and disable the electronic flash as inhibiting the FTR signal when the FL.EN signal is at L.

Also, a solid imaging device CCD 25 is actuated by the CCD driver 23 and an image processor circuit 26 processes the signal charges accumulated in CCD 25 in the form of image signals. A recording section 27 records the image signals processed by the image processor circuit 26 onto a floppy disk of still video. The distance metering section 28 measures an object distance on receipt of a distance measuring start signal from the central control circuit 21 and outputs the resultant measured value DVc back to the central control circuit 21.

The EXP signal is arranged to provide the timing for starting accumulation of signal charges and for stopping sweep-out of unnecessary charges by high-speed transfer.

Figure 13:
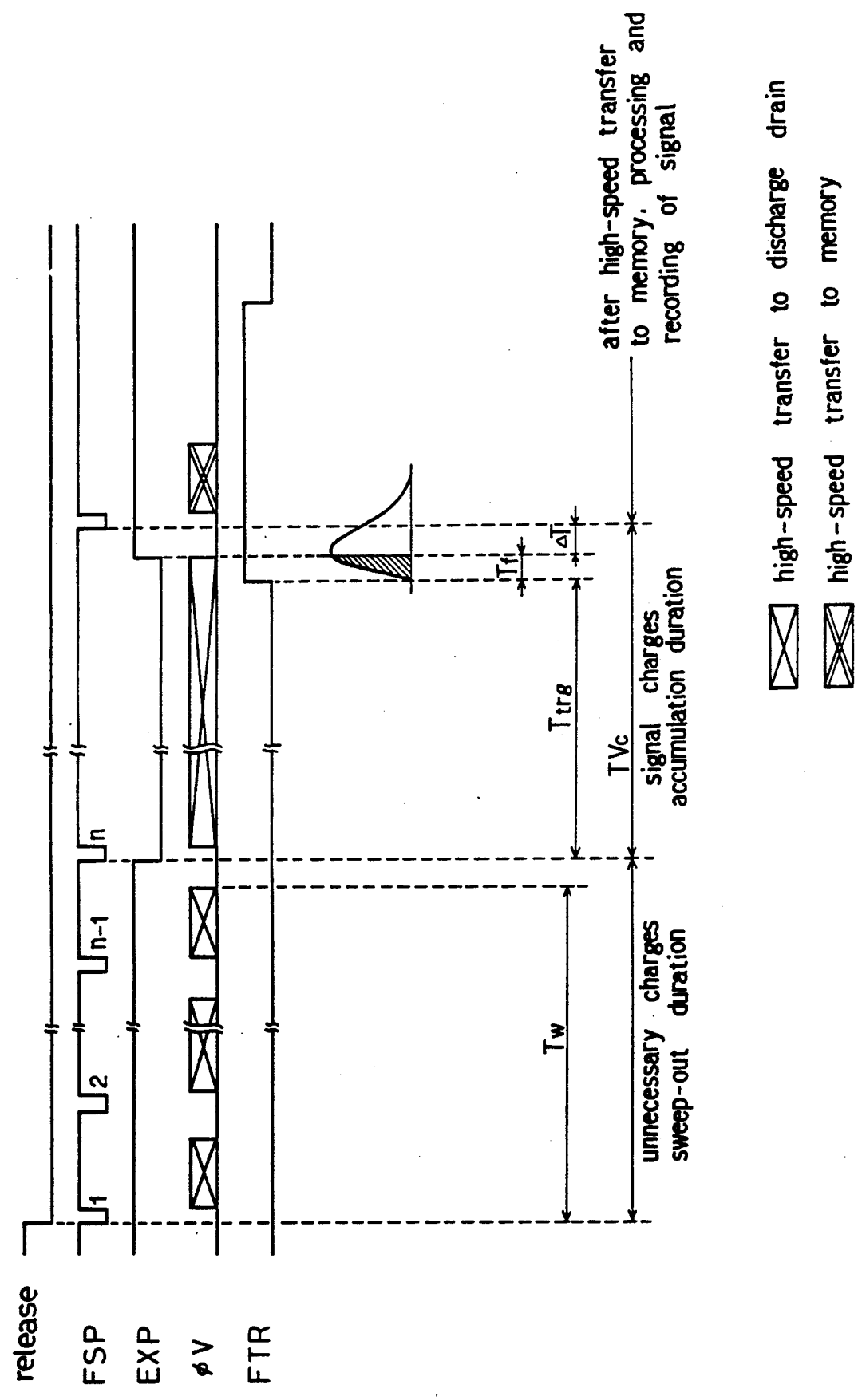
FIG. 13 is a diagram showing the operational timing of Embodiment 4.
Figure 15:
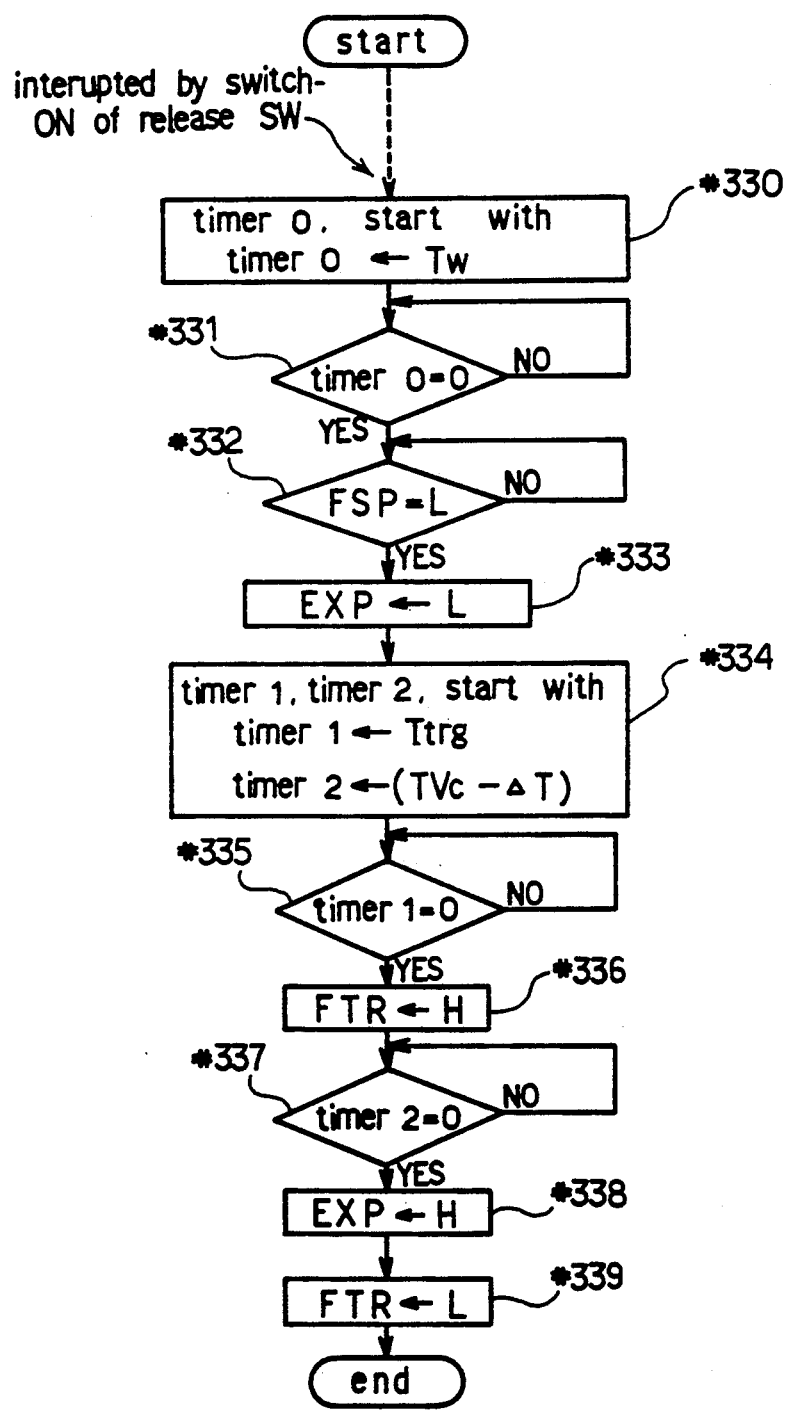
FIG. 15 is a flow chart showing the sequence of exposure procedures according to Embodiment 4.

The sequence of exposure procedures with flash emission according to Embodiment 4 will be described referring to FIGS. 12, 13, and 15.

When the release button switch SW is switched on, the CCD driver 23 outputs FSP and $\phi V$ pulse to transfer the unnecessary charges in a photoelectric converting section of the CCD 25 to a vertical transfer CCD with the FSP pulses and then, sweep them out to a discharge drain through high-speed reverse transfer with the $\phi V$ pulses. Simultaneously, the central control circuit 21 is interrupted by the actuation of the release button switch SW and sets its timer 0 with the time Tw required for repeating $(n-1)$ times the sweep-out actions to ensure the elimination of unnecessary charges by the high-speed reverse transfer (#330). When the count of timer 0 becomes zero (#331), the decay of FSP pulse is detected (#332) and the EXP signal is shifted from H to L (#333) in response to the decay of FSP pulse (shutter is open).

While the EXP signal remains at L, the CCD driver 23 outputs none of the FSP pulse and thus, the sweep-out by high-speed reverse transfer with the $\phi V$ pulses is only executed. The central control circuit 21 sets its timers 1 and 2 with the values of Ttrg and (TVc−ΔT) respectively and makes to start timer counting, corresponding to the decay of the EXP signal (#334). When the timer 1 counts down to zero (#335), the FTR signal is shifted from L to H allowing the electronic flash to emit light (#336). When the timer 2 counts down to zero (#337), the EXP signal is shifted from L to H to stop the sweep-out of unnecessary charges by the high-speed reverse transfer (#338). After the time ΔT from the stop of high-speed reverse transfer, the potential in the vertical transfer CCD becomes ready for accepting signal charges and then, the accumulated signal charges are transferred to the vertical transfer CCD with the FSP pulses (shutter is closed).

The signal charges transferred to the vertical transfer CCD is further transferred to the memory with the $\phi V$ pulses and processed as image signals by the image processor circuit 26, and subsequently recorded. Finally, the FTR signal is turned back to the original state of L and the sequence of exposure procedures is thus completed.

The fastest shutter speed will then be described. According to Embodiment 4, the time ΔT extending from the stop of high-speed reverse transfer to the readout of signal charges by high-speed transfer, is needed for allowing the potential in the vertical transfer CCD to be ready for accepting the signal charges built up. As the photoelectric counting section continues to accumulate the signal charges during the time ΔT, the fastest shutter speed is restricted by ΔT.

Figure 14:
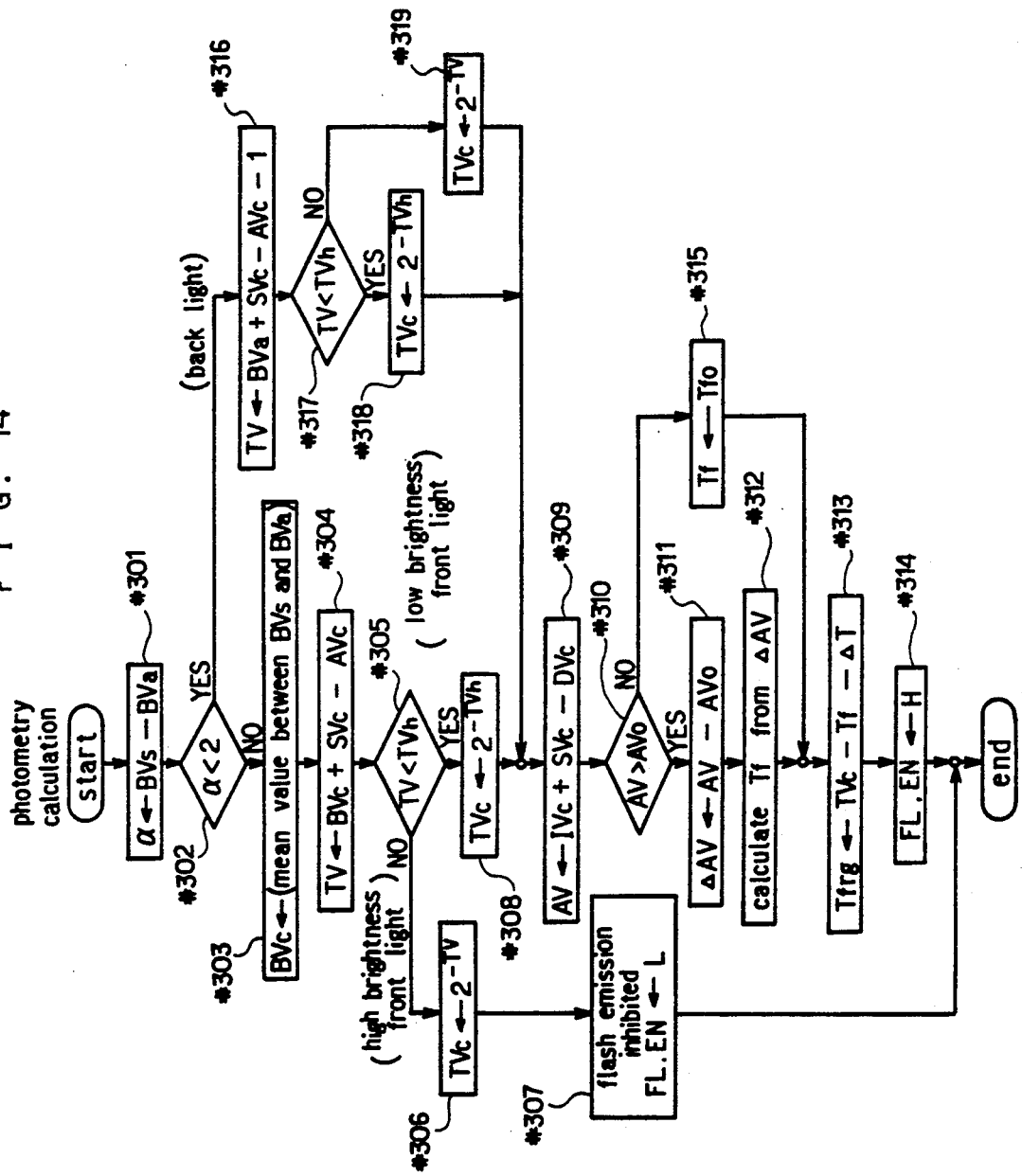
FIG. 14 is a flow chart showing the sequence of light measurements calculation according to Embodiment 4.

The sequence of calculation of photometry according to Embodiment 4 will then be described referring to a block diagram of FIG. 12 and a flow chart of FIG. 14.

Based on the data of pre-photometry inputted from the photometry section 22, the difference between a main object brightness BVs and the background brightness BVa is calculated and designated as $\alpha$ (#301). When $\alpha < 2$ or the brightness of the object is less 2 Ev under than that of the background, it is determined that the object is in a back light state and if not, it is judged that the object is in a front light state (#302).

When it is determined that the object is in a front light state, the mean brightness BVc between BVa and BVs is calculated (#303). The shutter speed TV is then obtained from the mean brightness BVc, the sensitivity SVc of the CCD, and the aperture value AVc of the optical system (#304). It is further judged whether the resultant shutter speed TV is faster than a camera-shake limiting shutter speed TVh (#305). If the shutter speed TV is faster than the speed TVh, TVc is set as an exposure time $2^{-TV}$ and then the flash emitting enable signal FL.EN is turned to L to inhibit flash emitting and the phototaking with ambient light is carried out (#306 and 307). If the speed TV is slower than the limiting speed TVh, $2^{-TVh}$ is set as an exposure time TVc and the sequence subsequent to the step of #309 will be carried out (#308).

When it is judged that the object is in a back light state, the shutter speed TV is determined so that the background becomes 1 Ev over exposure (#316). If the speed TV is faster than the camera-shake limiting shutter speed TVh, $2^{-TV}$ is set as TVc and if slower, $2^{-TVh}$ is set, and then, the sequence subsequent to the step of #309 will be carried out (#317, 318, and 319).

Sequences subsequent to the step #309 are for determining the timing of flash emitting. The proper aperture value AV is calculated from the flash emitting guide number IVc, the CCD sensitivity SV, and the distance data DVc inputted from the distance metering section (#309). The value AV is compared with the open aperture value AV0 of optical system (#310). If AV≦AV0, a full flash emitting time Tf0 is set as the flash emitting time Tf since the distance to the object is too far to cover with the flash light (#315). If AV>AV0, the difference ΔAV between the proper aperture value AV and the open aperture value AV0 is then calculated (#311). As the characteristics of the flash emission have been acknowledged, the proper flash emitting time Tf can be obtained corresponding to ΔAV (#312).

The flash emission timing Ttrg is thus calculated from the emitting time Tf, the exposure time TVc, and the time ΔT required for allowing the vertical transfer CCD to be ready for accepting the signal charges (#313). Finally, the FL.EN signal is turned to H allowing the electronic flash to emit light.

We claim:

1. An exposure control device for a still video camera having an imaging device provided with shutter function, an electronic flash device for emitting light when needed, and a light metering device for obtaining photometry data for exposure control comprising:
   means for actuating the electronic flash device to emit light during accumulation of signal charges in the imaging device;
   means for sweeping unnecessary charges out from a transfer section of the imaging device after the light emitting is completed;
   means for transferring accumulated signal charges to the transfer section after sweeping out the unnecessary charges; and
   means for controlling the light emitting based on the photometry data so as to have a proper accumulation time of the signal charges.

2. An exposure control device for a still video camera having an imaging device provided with shutter function, an electronic flash device for emitting light when needed, and a light metering device for obtaining brightness information of an object for exposure control comprising:
   means for calculating the accumulation time of signal charges in the imaging device based on the brightness information;
   means for actuating the electronic flash device to emit light at the same time when the accumulation of the signal charges starts and stopping the light emitting when the proper exposure on the object is attained;
   means for stopping the accumulation of the signal charges after a predetermined accumulation time and transferring the signal charges to a transfer section of the imaging device; and
   means for sweeping unnecessary charges out from the transfer section for a predetermined time period from a moment immediately after stopping the light emission to a moment before the transferring of the signal charges.

3. An exposure control device for a still video camera having an imaging device provided with shutter function, an electronic flash device for emitting light when needed, and a distance metering device for obtaining information of an object distance comprising:
   means for calculating the light emitting time period overlapping the accumulation time of signal charges in the imaging device based on the information of the object distance.

4. An exposure control device for a still video camera having an imaging device provided with shutter function, an electronic flash device for emitting light when needed, a light metering device for obtaining brightness information of an object for exposure control, and a distance metering device for obtaining information of the object distance comprising:
   means for calculating the accumulation time of signal charges in the imaging device based on the information of brightness with an ambient light; and
   means for calculating a timing of the light emission based on the information of the object distance, thereby starting the light emission before the accumulation so that the remaining amount of flash light after starting the accumulation is proper for obtaining the correct exposure.

5. An exposure control device for a still video camera having an imaging device provided with shutter function, an electronic flash device for emitting light when needed, a light metering device for obtaining brightness information of an object for exposure control, and a distance metering device for obtaining information of the object distance comprising:
   means for calculating the accumulation time of signal charges in the imaging device based on the information of brightness with an ambient light; and
   means for calculating a timing of the light emission based on the information of the object distance and a time period for allowing a vertical transfer portion of the imaging device to be ready for accepting the signal charges.

6. An exposure control device for a still video camera having an imaging device provided with shutter function, an electronic flash device for emitting light when needed, a light metering device for obtaining brightness information of an object for exposure control, and a distance metering device for obtaining information of the object distance comprising:
   means for calculating the accumulation time of signal charges in the imaging device based on the information of brightness with an ambient light;
   means for calculating a timing of the light emission based on the information of the object distance;
   means for starting and carrying on the accumulation of the signal charges until the calculated accumulation time elapses at every exposure; and
   means for starting the light emission at the calculated timing.

7. An exposure control device for a still video camera having an imaging device provided with shutter function, an electronic flash device for emitting light when needed, a light metering device for obtaining brightness information of an object for exposure control, and a distance metering device for obtaining information of the object distance comprising:
   means for calculating the accumulation time of signal charges in the imaging device based on the information of brightness with an ambient light;
   means for calculating a timing of the light emission based on the information of the object distance; and
   means for sweeping unnecessary charges out from a transfer section of the imaging device during a time period which is related to the accumulation time and the light emission timing.

8. An exposure control device for a still video camera having an imaging device provided with shutter function, an electronic flash device for emitting light when needed, and a distance metering device for obtaining information of an object distance comprising:
   means for calculating a light emitting time period overlapping an accumulation time of signal charges in the imaging device based on the information of the object distance; and
   means for sweeping unnecessary charges out from a transfer section of the imaging device within the time period overlapping the accumulation time and the light emitting time.

9. An exposure control device for a still video camera having an imaging device provided with shutter function, an electronic flash device for emitting light when needed, and a distance metering device for obtaining information of an object distance comprising:

means for calculating a light emitting time period overlapping an accumulation time of signal charges in the imaging device based on the information of the object distance; and means for starting the light emission before the accumulation of charge begins for obtaining the overlapping time period.

* * * * *